United States Patent
O'Connor et al.

(10) Patent No.: US 8,524,960 B2
(45) Date of Patent: Sep. 3, 2013

(54) FLUID CATALYTIC CRACKING OF OXYGENATED COMPOUNDS

(75) Inventors: Paul O'Connor, Hoevelaken (NL); George W. Huber, Amherst, MA (US); Avelino Corma Camos, Valencia (ES); Laurent Louis Andre Sauvanaud, Valencia (ES)

(73) Assignee: KiOR, Inc., Pasadena, TX (US)

( * ) Notice: Subject to any disclaimer, the term of this patent is extended or adjusted under 35 U.S.C. 154(b) by 0 days.

(21) Appl. No.: 13/196,489

(22) Filed: Aug. 2, 2011

(65) Prior Publication Data
US 2012/0198756 A1      Aug. 9, 2012

Related U.S. Application Data

(63) Continuation of application No. 12/377,388, filed as application No. PCT/EP2007/058467 on Aug. 15, 2007, now Pat. No. 8,207,385.

(30) Foreign Application Priority Data

Aug. 16, 2006   (EP) .................................... 06118982

(51) Int. Cl.
    *C10L 1/00* (2006.01)
(52) U.S. Cl.
    USPC ........... 585/240; 585/241; 585/242; 585/469; 585/638; 585/639; 585/733; 44/605; 44/606; 208/106; 208/113

(58) Field of Classification Search
USPC .................. 44/605–606; 585/240, 242, 469, 585/638–639, 733; 208/113–124
See application file for complete search history.

(56) References Cited

U.S. PATENT DOCUMENTS

| | | | | |
|---|---|---|---|---|
| 4,503,278 A | * | 3/1985 | Chen et al. | 585/469 |
| 4,880,473 A | * | 11/1989 | Scott et al. | 127/37 |
| 5,196,633 A | * | 3/1993 | Kresge et al. | 585/469 |
| 5,298,155 A | | 3/1994 | Sabottke | |
| 6,187,982 B1 | * | 2/2001 | Beck et al. | 585/409 |
| 2003/0127358 A1 | | 7/2003 | Letzsch | |
| 2004/0029717 A1 | | 2/2004 | O'Connor | |
| 2007/0007176 A1 | * | 1/2007 | Pinho et al. | 208/108 |
| 2009/0026112 A1 | * | 1/2009 | Dierickx et al. | 208/119 |

FOREIGN PATENT DOCUMENTS

| | | |
|---|---|---|
| BR | 8304794 | 4/1985 |
| CA | 1123774 | 5/1982 |
| JP | 562389 | 1/1981 |

OTHER PUBLICATIONS

Goldstein, I.S. (1981). Organic Chemicals from Biomass, CRC Press, 310 pgs.*
Cleveland, C.J. & Morris, C.(2009). Dictionary of Energy, Elsevier, 600 pgs [Office action references p. 410].*

(Continued)

*Primary Examiner* — Brian McCaig
(74) *Attorney, Agent, or Firm* — Hovey Williams LLP

(57) ABSTRACT

A process is disclosed for fluid catalytic cracking of oxygenated hydrocarbon compounds such as glycerol and bio-oil. In the process the oxygenated hydrocarbon compounds are contacted with a fluid cracking catalyst material for a period of less than 3 seconds.
In a preferred process a crude-oil derived material, such as VGO, is also contacted with the catalyst.

27 Claims, 25 Drawing Sheets

(56) References Cited

OTHER PUBLICATIONS

Craig Hulet et al: "A Review of Short Rsidence Time Cracking Processes", International Journal of Chemical Reactor Engineering, Berkeley Electronic Press, Berkeley, CA, vol. 3, 2005, pp. 1-76.

Lin et al: "Catalytic Conversion of Commingled Polymer Waste into Chemicals and Fuels Overspent FCC Commercial Catalyst in a Fluidized-Bed Reactor" Applied Catalysis B: Environmental, Elsevier, vol. 60, No. 3-4, Aug. 14, 2006, pp. 145-153; XP005812415.

Albertazzi, S et al: "Catalytic Properties of Hydrotalcite-type Anionic Clays" Interface Science and Technology, 2004, 1, pp. 496-546.

Gayubo et al: Deactivation of a HZSM-5 . . . Oil into Hydrocarbon; Energy and Fuels 18, 2004, pp. 1640-1647.

Graca et al: "Catalytic Cracking of Mixture of Model Bio-Oil Compounds and Gasoil", Applied Catalysis B, 2009, 90, pp. 556-563.

Adjaye et al: Production of Hydrocarbons . . . Various Catalysts; Fuel Processing Technology, 1995, 45, pp. 161-183.

Sharma et al: "Catalytic Upgrading of Pyrolysis Oil" Energy and Fuels, 1993, 7, pp. 306-314.

\* cited by examiner

FLUID CATALYTIC CRACKING OF OXYGENATED COMPOUNDS

CROSS REFERENCE TO RELATED APPLICATION

This is a continuation of application Ser. No. 12/377,388, now U.S. Pat. No. 8,207,385, filed Feb. 13, 2009, which is based on PCT International Application PCT/EP2007/058467, filed Aug. 15, 2007 which claims priority from European Patent Application No. 06118982.5 filed on Aug. 16, 2006, the entirety of each of the foregoing applications is hereby incorporated by reference.

BACKGROUND OF THE INVENTION

1. Field of the Invention

This invention relates to a process for production of olefins, aromatic, syn-gas (hydrogen, carbon monoxide), process heat, and coke by co-feeding oxygenated compounds, such as glycerol, carbohydrates, sugar alcohols or other oxygenated biomass-derived molecules such as starches, cellulose, and hemicellulose-derived compounds) with petroleum derived feedstocks in a modified fluid catalytic cracking process.

2. Description of the Related Art

Fluid catalytic cracking (FCC) is the most widely used process for the conversion of crude oil into gasoline, olefins and other hydrocarbons. The FCC process consists of two vessels coupled together as shown in FIG. 1. In the first reactor a hot particulate catalyst is contacted with hydrocarbon feedstocks, thereby producing cracked products and spent coked catalyst. After the cracking reaction takes place the catalyst is largely deactivated by coke.

The coked catalyst is separated from the cracked products, stripped of residual oil by steam stripping and then regenerated by burning the coke from the deactivated catalyst in a regenerator. The hot catalyst is then recycled to the riser reactor for additional cracking. A variety of process configurations and catalysts have been developed for the FCC process. The heart of the FCC catalyst is a faujasite zeolite. New medium, large and extra-large pore zeolites are actively searched to achieve a higher flexibility in product distribution.

The European Commission has set a goal that by 2010, 5.75% of transportation fuels in the EU will be biofuels. Blending biofuels with petroleum based fuels will help to reduce dependence on imported crude oil, reduce emission of greenhouse gases, and improve agricultural economies. Using FCC processes for biomass conversion does not require a significant capital investment, as FCC plants are already installed in petroleum refineries. It would therefore represent a considerable advance in the state of the art if efficient methods were developed to use the FCC process to convert biomass-derived molecules into transportation fuels.

Several methods have been reported for conversion of biomass-derived molecules into liquid fuels using zeolite catalysts. Chen and Koenig in U.S. Pat. No. 4,933,283 and U.S. Pat. No. 4,549,031 (Mobil) report a process for conversion of biomass derived carbohydrates, starches and furfural into liquid hydrocarbon products, CO, and coke, by passing aqueous streams over zeolite catalysts at 500° C.[Chen, 1986 #9; Chen, 1990 #10] They observed that 40-66% of the carbon leaves the reactor as coke when xylose, glucose, starch and sucrose are fed over a ZSM-5 catalyst at 500° C.[Chen, 1986 #9] Other products formed include hydrocarbons, CO, and $CO_2$. Mixing the aqueous-carbohydrate streams with methanol leads to lower levels of coke and higher levels of hydrocarbons being formed.

Chen et al. report the major challenge with biomass conversion to be the removal of oxygen from the biomass and enriching the hydrogen content of the hydrocarbon product. They define the effective hydrogen to carbon ratio ($H/C_{eff}$) defined in Equation 1. The $H/C_{eff}$ ratio of biomass derived-oxygenated hydrocarbon compounds is lower than petroleum-derived feedstocks due to the high oxygen content of biomass-derived molecules. The $H/C_{eff}$ ratio of carbohydrates, sorbitol and glycerol (all biomass-derived compounds) are 0, 1/3 and 2/3 respectively. The $H/C_{eff}$ ratio of petroleum-derived feeds ranges from 2 (for liquid alkanes) to 1 (for benzene). In this respect, biomass can be viewed as a hydrogen deficient molecule when compared to petroleum-based feedstocks.

$$H/C_{eff} = \frac{H - 2O - 3N - 2S}{C} \quad (1)$$

where H, C, O, N and S are the moles of hydrogen, carbon, oxygen, nitrogen and sulfur respectively.

Glycerol is currently a valuable by-product of biodiesel production, which involves the transesterification of triglycerides to the corresponding methyl or ethyl esters. As biodiesel production increases, the price of glycerol is projected to drop significantly. In fact, the price of glycerol has already dropped by almost half over the last few years. [McCoy, 2005 #6] Therefore it is desirable to develop inexpensive processes for the conversion of glycerol into chemicals and fuels.

Methods for conversion of solid biomass into liquids by acid hydrolysis, pyrolysis, and liquefaction are well known [Klass, 1998 #12]. Solid materials including lignin, humic acid, and coke are byproducts of the above reaction. A wide range of products are produced from the above reactions including: cellulose, hemicellulose, lignin, polysaccharides, monosaccharides (e.g. glucose, xylose, galatose), furfural, polysaccharides, and lignin derived alcohols (coumaryl, coniferyl and sinapyl alcohols).

Bio-oils, produced by fast pyrolysis or liquefaction of biomass, are a mixture of more than 300 compounds. Bio-oils are thermally unstable, and need to be upgraded if they are to be used as fuels. Bio-oils, and bio-oil components, can be converted to more stable fuels using zeolite catalysts. [Bridgwater, 1994 #14] Reaction conditions used for the above process are temperatures from 350-500° C., atmospheric pressure, and gas hourly space velocities of around 2. The products from this reaction include hydrocarbons (aromatic, aliphatic), water-soluble organics, water, oil-soluble organics, gases ($CO_2$, CO, light alkanes), and coke. During this process a number of reactions occur including dehydration, cracking, polymerization, deoxygenation, and aromatization. However poor hydrocarbon yields and high yields of coke generally occur under these reaction conditions, limiting the usefulness of zeolite upgrading.

Bakhshi and co-workers studied zeolite upgrading of wood derived fast-pyrolysis bio-oils and observed that between 30-40 wt % of the bio-oil formed coke or char. (Sharma and Bakhshi 1993; Katikaneni, Adjaye et al. 1995; Adjaye, Katikaneni et al. 1996) The ZSM-5 catalyst produced the highest amount (34 wt % of feed) of liquid organic products of any catalyst tested. The products in the organic carbon were mostly aromatics for ZSM-5, and aliphatics for $SiO_2$—$Al_2O_3$. Gaseous products include $CO_2$, CO, light alkanes, and light olefins. Bio-oils are thermally unstable and thermal cracking reactions occur during zeolite upgrading. Bakhshi and co-workers also developed a two-reactor process, where only thermal reactions occur in the first empty reactor, and catalytic reactions occur in the second reactor that contains the catalyst. (Srinivas, Dalai et al. 2000) The reported advantage of the two-reactor system is that it improved catalyst life by reducing the amount of coke deposited on the catalyst.

The transformation of model bio-oil compounds, including alcohols, phenols, aldehydes, ketones, acids, and mixtures, have been studied over HZSM-5 catalysts. (Gayubo, Aguayo et al. 2004; Gayubo, Aguayo et al. 2004; Gayubo, Aguayo et al. 2005) Alcohols were converted into olefins at temperatures around 200° C., then to higher olefins at 250° C., followed by paraffins and a small proportion of aromatics at 350° C. (Gayubo, Aguayo et al. 2004) Phenol has a low reactivity on HZSM-5 and only produces small amounts of propylene and butanes. 2-Methoxyphenol also has a low reactivity to hydrocarbons and thermally decomposes, generating coke. Acetaldehyde had a low reactivity on ZSM-5 catalysts, and it also underwent thermal decomposition leading to coking problems. (Gayubo, Aguayo et al. 2004) Acetone, which is less reactive than alcohols, converts into $C_{5+}$ olefins at temperatures above 350° C. These olefins are then converted into $C_{5+}$ paraffins, aromatics and light alkenes. Acetic acid is first converted to acetone, and that then reacts as above. Products from zeolite upgrading of acetic acid and acetone give considerably more coke than products from alcohol feedstocks. Thus, different molecules in the bio-oils have a significant difference in reactivity and coke formation rates.

Catalytic cracking of vegetable oil can be used to produce a liquid fuel that contains linear and cyclic paraffins, olefins, aldehydes, ketones, and carboxylic acids. The cracking of vegetable oils has been studied since 1921, and pyrolysis products of vegetable oils were used as a fuel during the $1^{st}$ and $2^{nd}$ World Wars. Both homogeneous and heterogeneous reactions are occurring during catalytic cracking of vegetable oils. The pyrolysis reaction can be done with or without a catalyst, and a number of catalysts have been tested including HZSM-5, β-zeolite, and USY.[60,61] Twaiq et al. used a ZSM-5 catalyst to produce yields of 28, 9, and 5% gasoline, kerosene, and diesel fuel respectively from a Palm oil feed. Lima et al. claim that pyrolysis products with a ZSM-5 catalyst and soybean and palm oil feedstock, have fuel properties similar to Brazilian Diesel Fuel.

SUMMARY OF THE INVENTION

This invention generally relates to a process for fluid catalytic cracking of oxygenated hydrocarbon compounds, comprising the step of contacting a reaction feed comprising an oxygenated hydrocarbon compound with a fluid cracking catalyst material for a period of less than 3 seconds, at a temperature in the range of 300 to 700° C.

This invention more specifically relates to a process for production of olefins, aromatic, syn-gas (hydrogen, carbon monoxide), process heat, alkanes, and coke by co-feeding of glycerol, carbohydrates, sugar alcohols or other biomass derived molecules with high concentrations of oxygen (including starches, cellulose-derived compounds, and hemicellulose-derived compounds) with petroleum derived feedstocks in a modified fluid catalytic cracking process. Mixtures of these compounds, such as those found in bio-oils derived from pyrolysis or liquefaction, are also included in the biomass-derived oxygenate definition.

BRIEF DESCRIPTION OF THE DRAWINGS

A specific embodiment of the invention will be explained with reference to the drawings, of which.

DESCRIPTION OF ILLUSTRATIVE EMBODIMENTS

Figure 1:
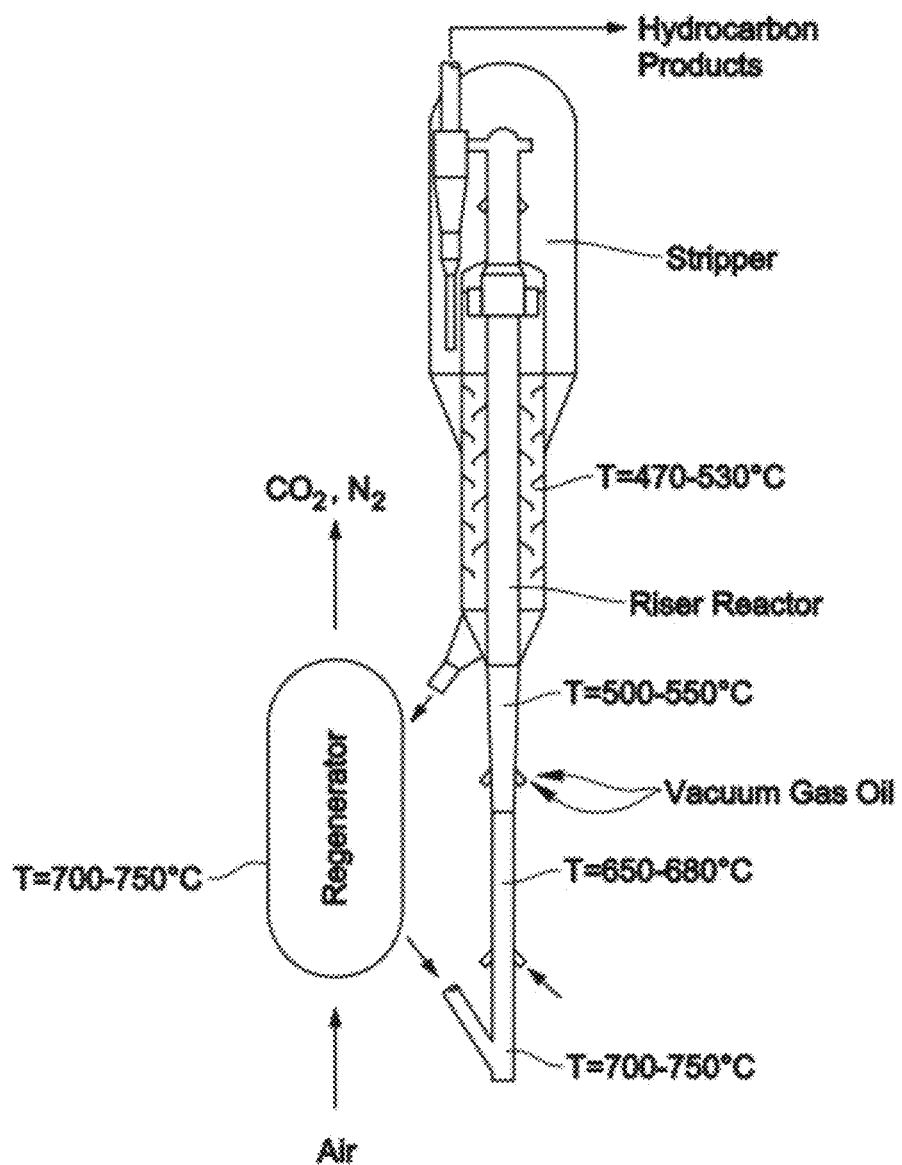
FIG. 1 is a flow diagram of a typical FCC process.

This invention generally relates to a process for fluid catalytic cracking of oxygenated hydrocarbon compounds, comprising the step of contacting a reaction feed comprising an oxygenated hydrocarbon compound with a fluid cracking catalyst material for a period of less than 3 seconds, at a temperature in the range of 300 to 700° C. In a preferred embodiment the contact time is less than 1 second.

The contact time is defined as 1/GHSV, wherein GHSV stands for Gas Hourly Space Velocity. It will be understood that the contact time referred herein is the mean contact time of the oxygenated hydrocarbon compounds with the fluid cracking catalyst material. Individual oxygenated hydrocarbon molecules may have contact times that are longer or shorter than the mean. The skilled person will further appreciate that the mean residence time of the catalyst particles in the reactor may be different from the mean contact time as defined herein; in the sense that the mean residence time of the catalyst particles in the reactor may be longer than the mean contact time, but not shorter.

This invention more specifically relates to a process for production of olefins, aromatics, syn-gas (hydrogen, carbon monoxide), process heat, alkanes, and coke by co-feeding of glycerol, carbohydrates, sugar alcohols or other biomass derived oxygenated compounds such as starches, cellulose-derived compounds, and hemicellulose-derived compounds with petroleum derived feedstocks in a standard or modified fluid catalytic cracking process. Mixtures of oxygenated compounds, such as those found in bio-oils derived from pyrolysis or liquefaction, are also included in the definition of biomass-derived oxygenated compound. In general, oxygenated hydrocarbon compounds that have been produced via the liquefaction of a solid biomass material are particularly preferred. In a specific embodiment the oxygenated hydrocarbon compounds are produced via a mild hydrothermal conversion process, such as described in co-pending application EP 061135646, filed on May 5, 2006, the disclosures of which are incorporated herein by reference. In an alternate specific embodiment the oxygenated hydrocarbon compounds are produced via a mild pyrolysis process, such as described in co-pending application EP 061135679, filed on May 5, 2006, the disclosures of which are incorporated herein by reference.

The oxygenated hydrocarbon compounds may be mixed with an inorganic material, for example as a result of the process by which they were obtained. In particular, solid biomass may have been treated with a particulate inorganic material in a process such as described in co-pending application EP 061135810, filed May 5, 2006, the disclosures of which are incorporated herein by reference. These materials may subsequently be liquefied in the process of EP 061135646 or that of EP 061135679, cited herein above. The resulting liquid products contain the inorganic particles. It is not necessary to remove the inorganic particles from the oxygenated hydrocarbon compounds prior to the use of these compounds in the process of the present invention. To the contrary, it may be advantageous to leave the inorganic particles in the oxygenated hydrocarbon feed, in particular if the inorganic material is a catalytically active material.

It has been found that the reaction feed may comprise significant amounts of water. This is particularly advantageous, because feedstocks such as bio-oil and glycerol derived from biomass conversion processes tend to be mixed with water. For example, a biodiesel transesterification process produces glycerol and water in a 1:3 molar ratio. The process of the present invention does not require water to be removed from the oxygenated material prior to their being fed into the catalytic cracking reactor.

In a preferred embodiment the reaction feed further comprises a crude oil-derived material, for example vacuum gas-oil.

Figure 2:
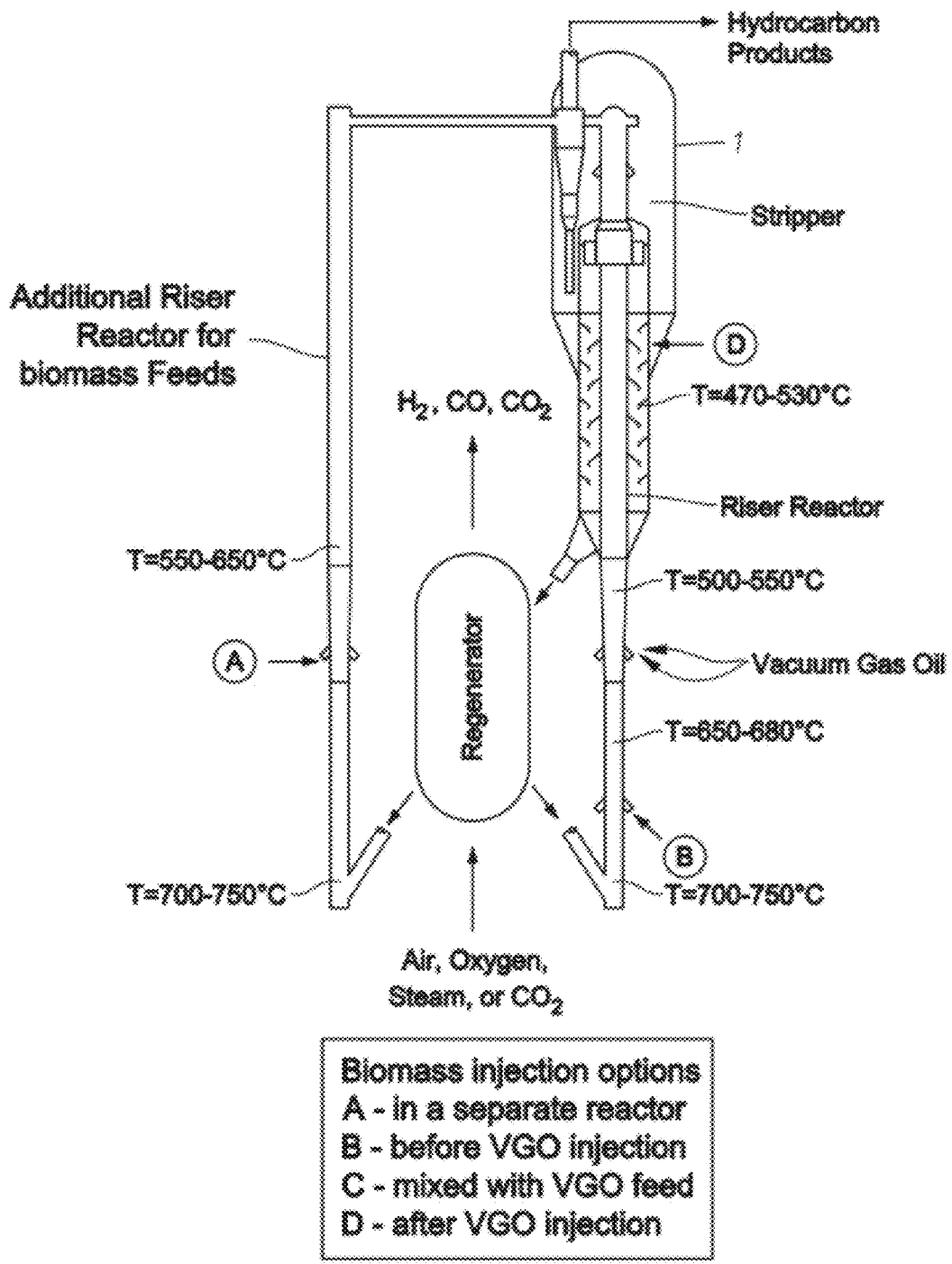
FIG. 2 is a flow diagram of a modified FCC process for co-feeding biomass-derived oxygenated hydrocarbon compounds with petroleum feedstocks.

The biomass-derived oxygenated compounds can be fed in different locations in the FCC process, as shown in FIG. 2, including: (1) in a separate riser reactor, (2) before introduction of vacuum gas-oil, (3) with vacuum gas-oil, or (4) after vacuum gas-oil on a partially deactivated catalyst. In general, best results are obtained when the oxygenated compounds are fed into a separate riser reactor (option (1)), or in the main riser reactor after the vacuum gas-oil (option (4)), because it allows for short contact times of the oxygenated compounds with the fluid catalytic cracking catalyst material. It is also possible to feed the oxygenated compound into the stripper.

Injection of glycerol in a parallel-separate reactor to vacuum gas-oil (VGO) cracking allows for an intermediate operation. Before VGO injection point, very severe cracking conditions (high temperature, high catalyst to oil ratio) can be encountered. Injecting the biomass feedstock with VGO can also be done at high or moderate temperatures. After the VGO injection point, or in the stripper, very soft cracking conditions are available (moderate temperature, coked catalyst with reduced activity). The choice of where to inject the VGO feedstock will depend on the desired products and catalyst used. As discussed in Example 3, feeding the biomass-derived feedstock with the VGO can have important synergistic effects including ethylene, propylene and butane yields much higher than either VGO or glycerol cracking.

The cracking catalyst material for use in the present invention may be a conventional FCC catalyst material. FCC catalysts generally comprise a zeolite, such as zeolite USY, a matrix material, such as alumina, and a kaolin clay. The catalyst may further comprise additives for trapping metal contaminants, for converting sulphur compounds, and the like, as will be readily understood by a person skilled in the FCC art.

In the alternative the cracking catalyst material comprises a basic material. Examples of suitable basic materials include layered materials, and materials obtained by heat-treating layered materials. Preferably the layered materials are selected from the group consisting of smectites, anionic clays, layered hydroxy salts, and mixtures thereof. Hydrotalcite-like materials, in particular Mg—Al and Ca—Al anionic clays, are particularly preferred. It has surprisingly been found that basic materials are suitable for the cracking of a crude-oil derived material, such as VGO, as may be used as a first feedstock in certain embodiments of the process of the present invention.

The basic catalytic materials may be used as such, or may be used in admixture with a conventional FCC cracking catalyst.

Figure 3:
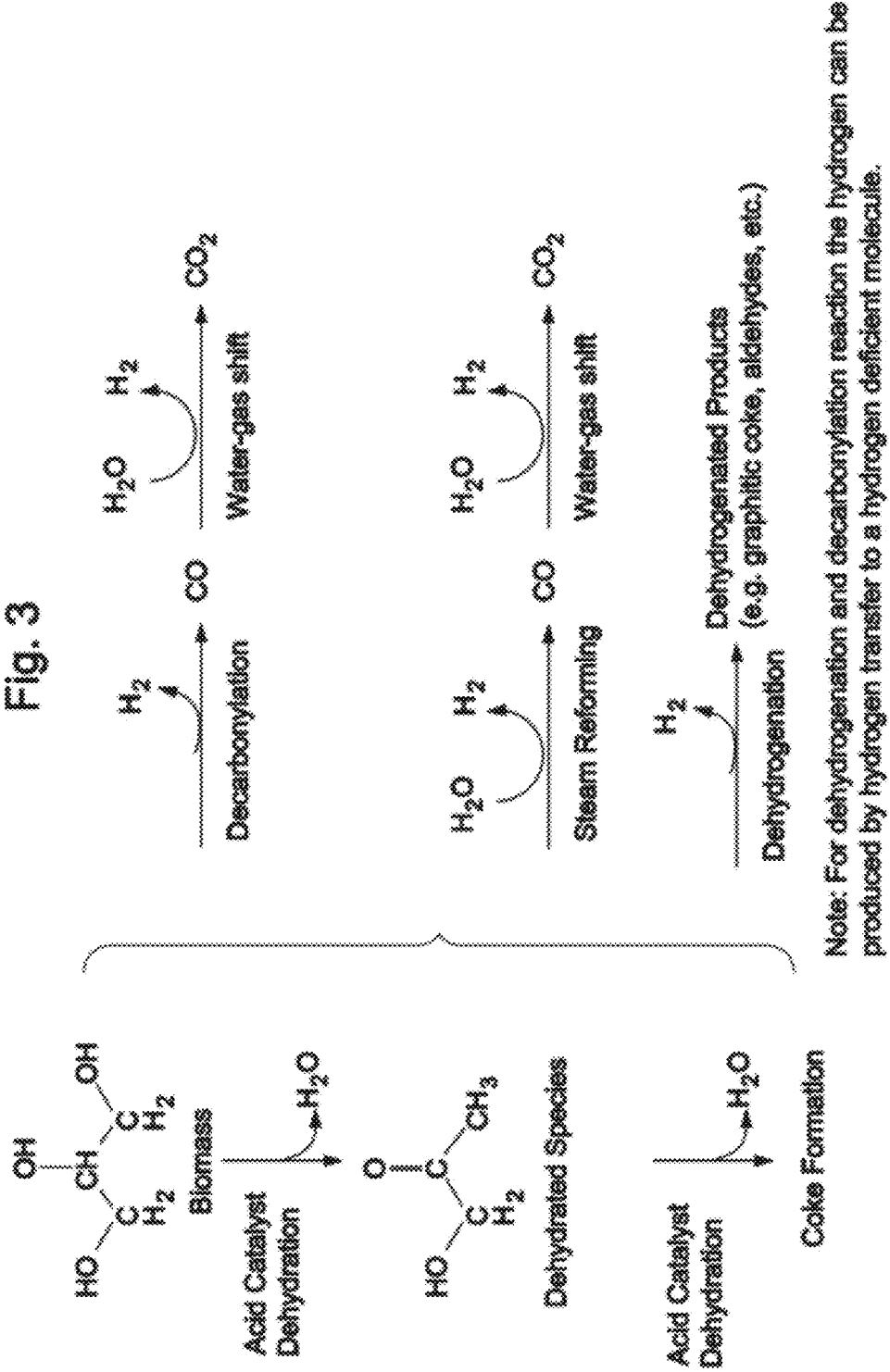
FIG. 3 shows hydrogen producing reactions for catalytic cracking of biomass.
Figure 4:
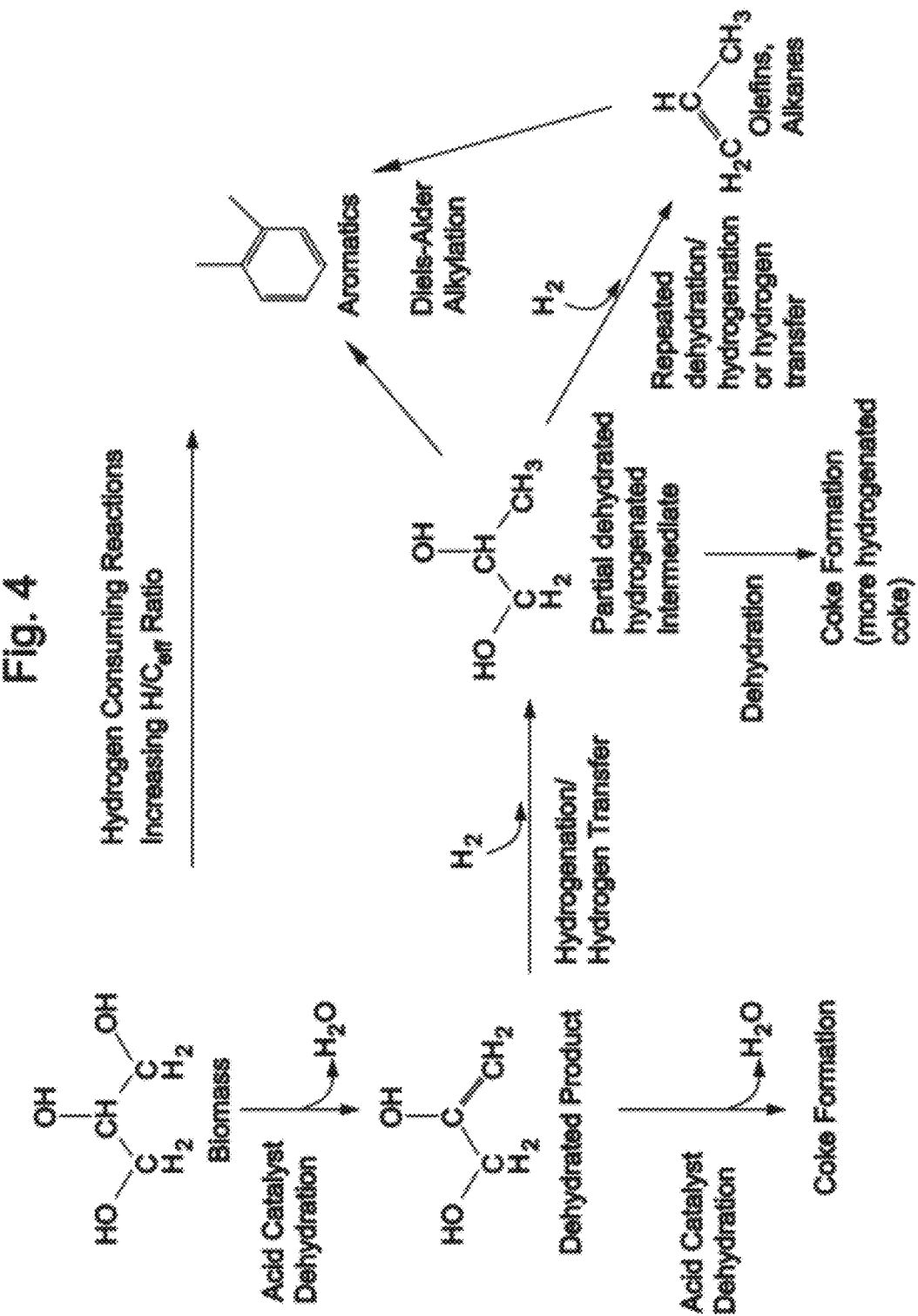
FIG. 4 shows hydrogen consuming reactions for catalytic cracking of biomass.

The conversion of biomass-derived oxygenated hydrocarbon compounds in the FCC process occurs mainly through a series of dehydration, hydrogen producing, hydrogen consuming, and aromatic forming reactions. In FIGS. 3 and 4 we use glycerol to represent biomass-derived oxygenated hydrocarbon compounds. In this process $H_2$ may be produced through steam-reforming or direct dehydrogenation of the carbohydrates and hydrocarbons, water-gas shift, and decarbonylation of partially dehydrated species as shown in FIG. 3. These reactions may produce CO, $CO_2$, and coke as well as hydrogen. The hydrogen produced in these reactions may be consumed in reactions that increase the $H/C_{eff}$ ratio of the products as shown in FIG. 4, leading to olefins and alkanes. Hydrogen may be exchanged directly through hydrogen transfer reactions between two hydrocarbon/carbohydrates chains, or through consecutive dehydrogenation/hydrogenation processes. Hydrogen transfer reactions occur on acid sites, while dehydrogenation/hydrogenation reactions are greatly accelerated by the presence of a metal. Aromatics are produced during this process probably by a diels-alder reaction and condensation of olefins and partially dehydrated/hydrogenated species. To selectively produce olefins and aromatics, the dehydration, hydrogen producing and hydrogen transfer reactions must be properly balanced by choosing the proper catalysts and reaction conditions.

The process of the present invention provides (1) fuels that are obtained from sustainable biomass resources, (2) a reduction in $CO_2$ emissions from petroleum plants, (3) a reduction of the amount of petroleum feedstocks in a petroleum refinery and (4) utilization of FCC technology that is already developed and in use in petroleum refineries therefore co-feeding of biomass into an FCC unit would not require a significant capital investment.

EXAMPLES

The following Examples are included solely to provide a more complete disclosure of the subject invention. Thus, the following Examples serve to illuminate the nature of the invention, but do not limit the scope of the invention disclosed and claimed herein in any fashion.

Experiments described herein were performed in a Micro-activity test (herein referred to as MAT). [Corma, 1990 #15]. The reaction zone and product recovery system were designed in accordance with ASTM D-3907. Before each experiment the MAT system was purged with a 50 ml/min $N_2$ flow during 30 min at the reaction temperature. After reaction, stripping of the catalyst was carried out for 15 min using a $N_2$ flow of 40 ml/min. During the reaction and stripping steps, the liquid products were collected in the corresponding glass receivers located at the exit of the reactor, kept at a temperature of 278 K by means of a computer-controlled bath. Meanwhile the gaseous products were collected in a gas burette by water displacement. After stripping, the catalyst was regenerated at a temperature of 813 K for 3 hours, in a 100 ml/min stream of air. The gases were analyzed using a Varian 3800-GC equipped with three detectors, a Thermal Conductivity Detector (TCD) for analysis of $H_2$ and $N_2$, which were separated in a 15 m molecular sieve column, and a Flame Ionization Detector (FID), and for $C_1$ to $C_6$ hydrocarbons separated in a 30 m Plot/$Al_2O_3$ column. Simulated distillation of the liquids was carried out with a Varian 3800-GC following the ASTM-2887-D procedure. Cuts were made at 423.8 K for light gasoline, 489.3 K for heavy gasoline and 617.1 K for LCO. The $CO_2$ formed during the regeneration step was monitored and quantified by means of an IR cell.

Carbon yields are defined below as the moles of carbon in the produced divided by the moles of carbon in the feed. All conversions below are reported on a per carbon basis. Hydrogen selectivity defined below as the moles of hydrogen divided by the potential moles of hydrogen produced. The potential moles of hydrogen produced are the moles of produced carbon times the hydrogen to carbon ratio in the feed plus the moles of $CO_2$ produced.

Six different catalysts were used for these examples. The physical-chemical characteristics of the six solids used in this study are presented in Table 1. They include a fresh commercial FCC catalysts containing Y-zeolite in a silica-alumina matrix (FCC1), a commercial equilibrium FCC catalysts with V and Ni impurities (ECat), $Al_2O_3$, a Y zeolite (Y), a ZSM-5 FCC additive (ZSM5), and a low-surface area inert silicon carbide (SIC). Ecat had a metal content of 4400 ppm V and 1600 ppm Ni. The FCC1 catalyst was laboratory-deactivated during 4 hours at 816° C. under a steam-vapor atmosphere, and had no contamination metal content. The Y-zeolite was CBU 500, steamed for 4 h at 816° C. The ZSM-5 zeolite was mixed with a clay binder, to around 15% weight. A glycerol solution was prepared with 99.5 weight percent glycerol (Aldrich Chemicals) diluted at a 1:1 weight ratio (about a 1:5 molar ratio glycerol/water) with distilled water. A sorbitol solution was prepared with 99% sorbitol and the same water 1:1 weight ratio water dilution.

TABLE 1

Catalytic properties of catalysts used

| Catalyst | Si/Al | BET Surface Area (m$^2$/g) | Particle Size | Micropore Volume (cm$^3$/g) |
|---|---|---|---|---|
| FCC1 | 13 | 290 | 0.1 | 0.087 |
| ECat | 20 | 156 | 0.1 | 0.050 |
| ZSM-5 additive | 50 | 70 | 0.1 | 0.027 |
| Al$_2$O$_3$ | 0 | 150 | 0.2-0.4 | 0 |
| Y-Zeolite | 12 | 400 | 0.2-0.4 | 0.122 |
| Silicon Carbide (SiC) | — | <1 | 0.4-0.8 | <0.001 |

Example 1

Figure 5:
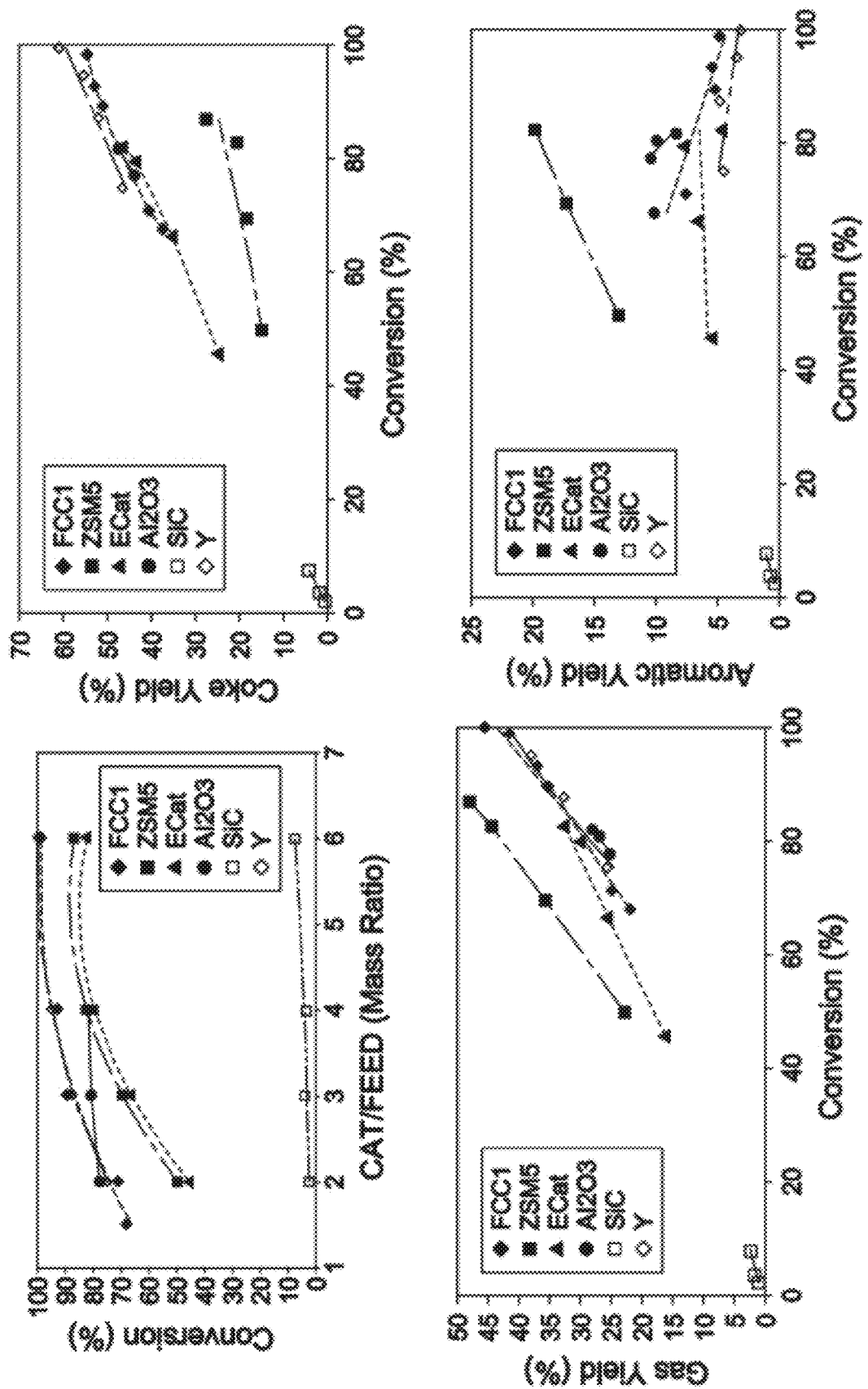
FIG. 5 shows the effect of catalyst composition on the catalytic cracking of a 50 wt % glycerol-water solution in MAT reactor. (Key: Filled Diamonds-FCC1, Filled Squares-ZSM5, Triangles-ECat, Circles-$Al_2O_3$, Open Squares-silicon-carbide, Open Diamonds-Y-zeolite. Glycerol feed into reactor as a 50 wt % glycerol-water mixture. Yields are based on carbon molar selectivity. Conversion includes coke plus gases plus aromatics.)
Figure 6A:
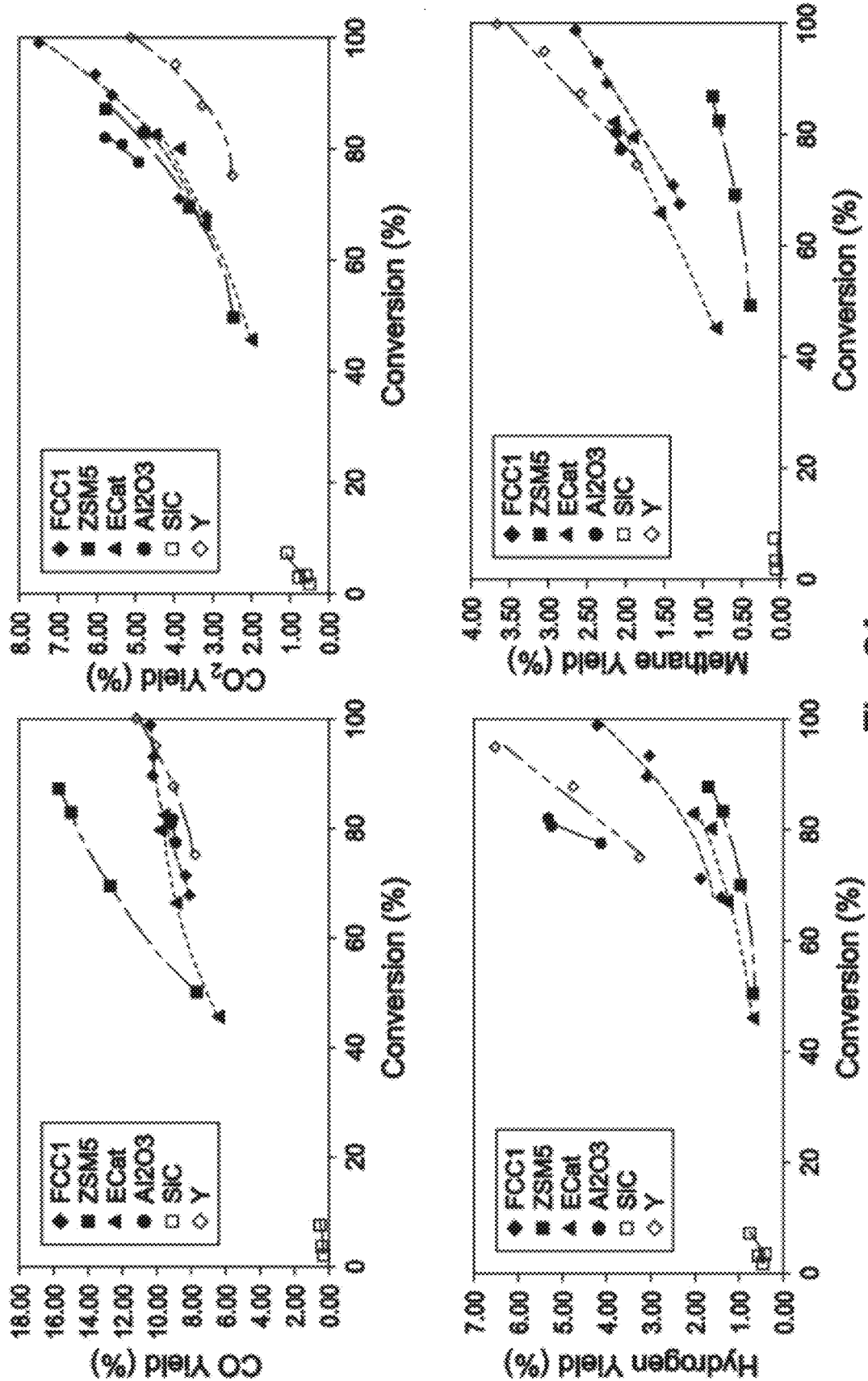
FIG. 6 shows the effect of catalyst composition on gas phase yields for the catalytic cracking of a 50 wt % glycerol-water solution in MAT reactor. (Key: Filled Diamonds-FCC1, Filled Squares-ZSM5, Triangles-ECat, Circles-$Al_2O_3$, Open Squares-silicon-carbide, Open Diamonds-Y-zeolite. Glycerol fed into reactor as a 50 wt % glycerol-water mixture. Yields are based on carbon molar selectivity. Conversion includes coke plus gases plus aromatics.)
Figure 6B:
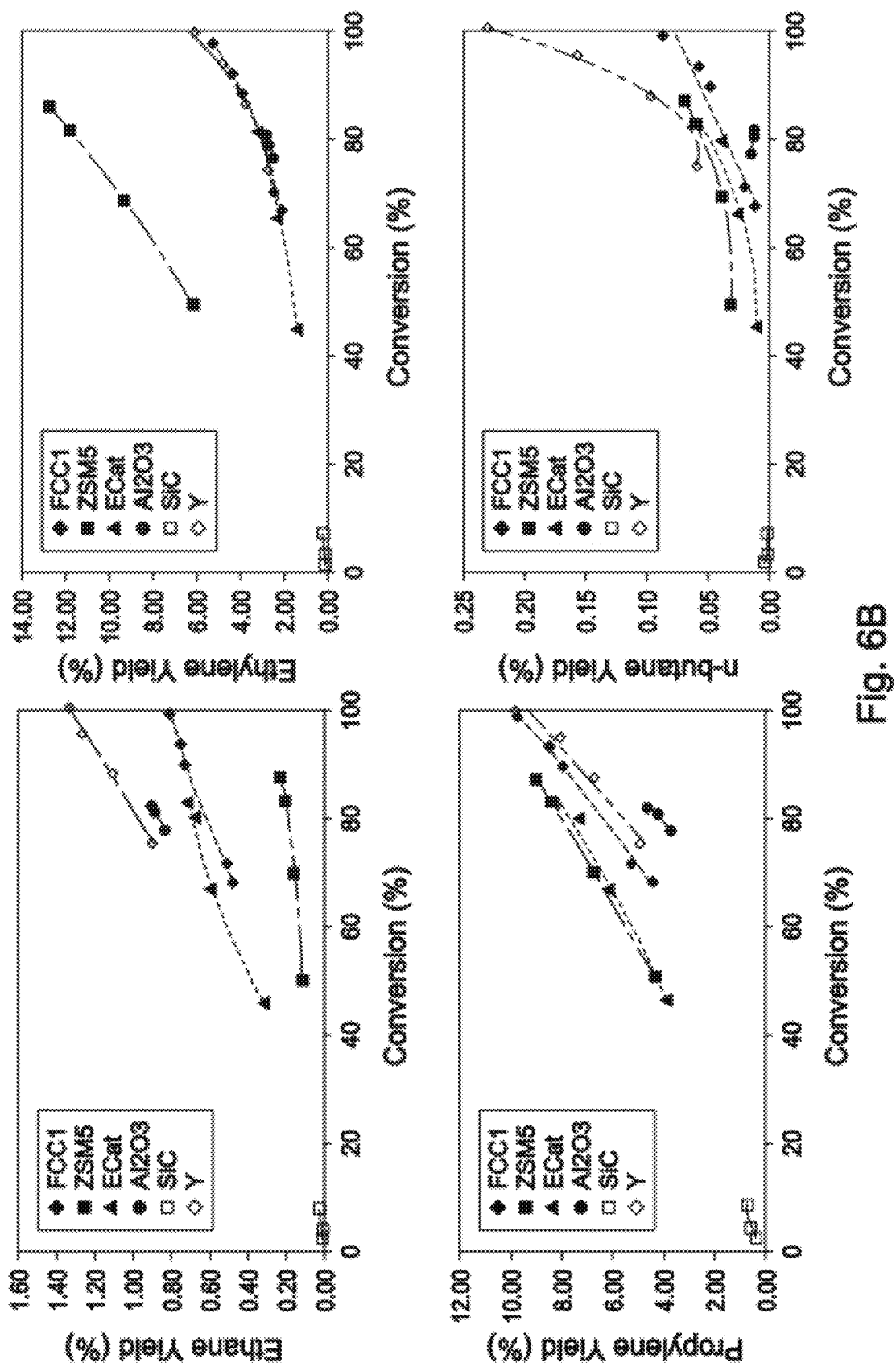
Figure 6C:
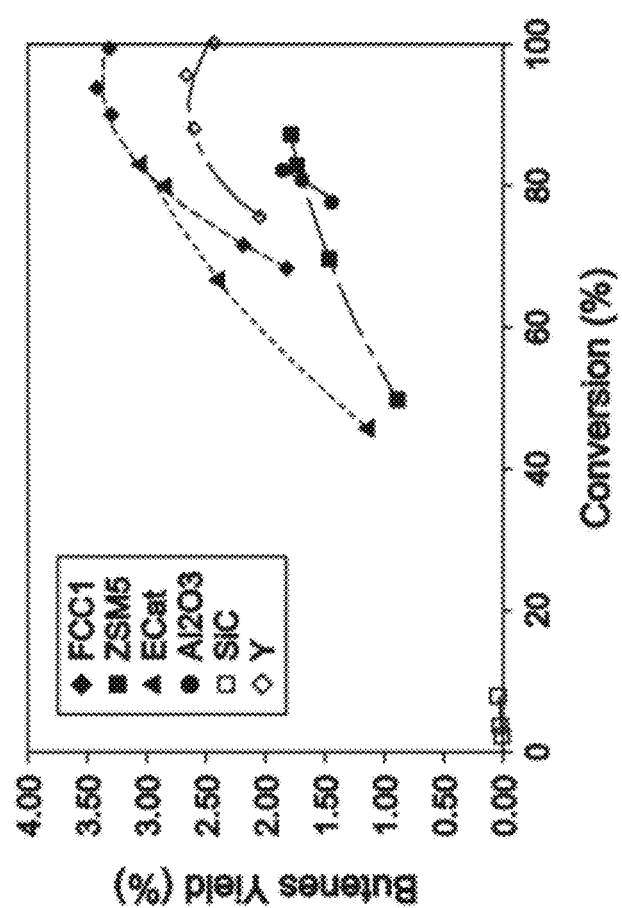
Figure 7:
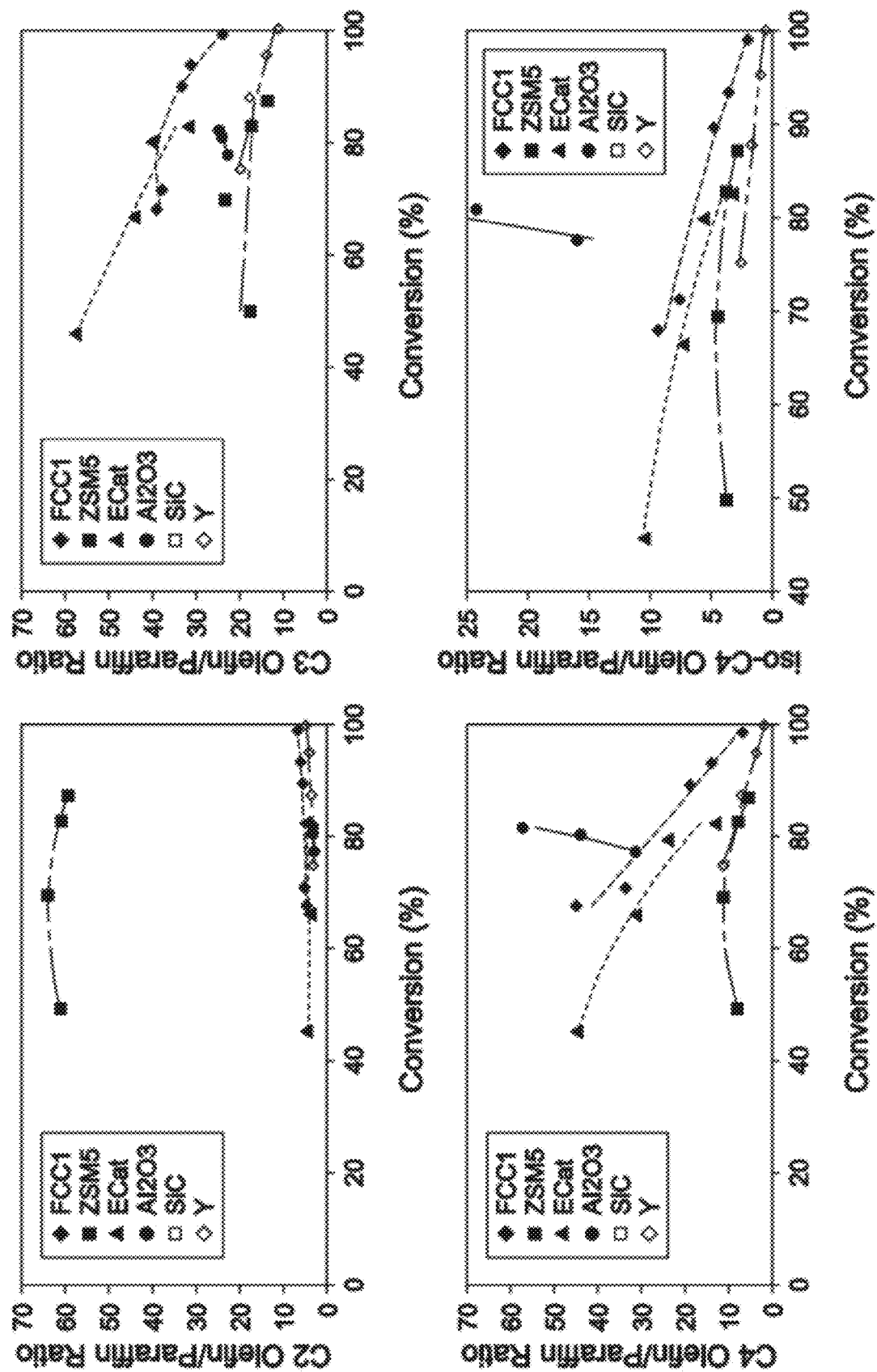
FIG. 7 shows the effect of catalyst composition on the olefin-to-paraffin ratio and $C_4$ isomer-to-paraffin ratio for the catalytic cracking of a 50 wt % glycerol-water solution in MAT reactor. (Key: Filled Diamonds-FCC1, Filled Squares-ZSM5, Triangles-ECat, Circles-$Al_2O_3$, Open Squares-silicon-carbide, Open Diamonds-Y-zeolite. Glycerol fed into reactor as a 50 wt % glycerol-water mixture. Yields are based on carbon molar selectivity. Conversion includes coke plus gases plus aromatics.)

Six different catalysts were tested for catalytic cracking of an aqueous 50 wt % glycerol as shown in FIGS. 5-7, including FCC1, ECat, Al$_2$O$_3$, Y, ZSM75, and SiC. The products for the FCC1 catalyst include coke, gases, and liquid products. Between 30-50% of the carbon in the glycerol feed was converted into coke for the FCC1 catalyst (FIG. 5). The coke yield increased as the conversion increased, while the aromatic yield decreased as the conversion increased for the FCC1 catalyst. This may be due to formation of coke from the aromatic compounds. The gas phase yields for FCC1 decreased from CO>propylene>CO$_2$> ethylene> butene>methane>ethane>propane>n-butane (FIG. 6). Alkanes and olefins were produced together with aromatics and coke, which indicates that hydrogen transfer reactions have a strong impact on the final product distribution. The C$_3$ and C$_4$ olefin-to-paraffin ratio for FCC1 was greater than 10 as shown in FIG. 7.

Petroleum-derived feeds typically contain metal impurities (V, Ni and Fe), which deposit themselves onto the catalyst during the FCC reaction. Thus, in order to study the potential effect of metals (mainly V and Ni) on product distribution, we tested a FCC equilibrium catalyst(ECAT) containing 4400 ppm V and 1600 ppm Ni. This catalyst gave a lower activity than the fresh FCC1 catalyst, as could be expected from the higher content of zeolite and surface area of the latter. However, the product selectivity for the FCC1 and ECAT catalyst was very similar, indicating that V and Ni have little or no catalytic effect. Thermal cracking of glycerol was studied by using an "inert" SiC material. The low activity of the "inert" SiC shows that glycerol has a high thermal stability, and thermal reactions are negligible in comparison to the catalytic transformation.

FCC catalysts contain Al$_2$O$_3$, SiO$_2$—Al$_2$O$_3$ and Y-zeolite in the catalyst matrix. The Al$_2$O$_3$ catalyst had similar gas and coke yields as the FCC1 and ECat catalysts. The gas-phase yields for Al$_2$O$_3$ where also similar to those of FCC1 and ECat, with the exception that Al$_2$O$_3$ has higher H$_2$ and ethane yields, and lower propylene, n-butane, butane, and aromatic yields, than FCC1 and ECat.

The Y-zeolite had a catalytic activity similar to the FCC1 catalyst. The fact that high conversions were obtained with the Y-zeolite and γ-Al$_2$O$_3$ catalysts shows that dehydration reactions can occur readily on both Bronstedt and Lewis acid sites. When comparing the pure zeolite component with the FCC1 catalyst it can be seen that the coke yield was slightly higher for Y-zeolite than FCC1. The aromatic yield was lower for the Y-zeolite than for FCC1. The other differences between Y-zeolite and FCC1 are that the Y-zeolite gave a lower CO$_2$ yield and higher C$_1$-C$_4$ alkane and H$_2$ yields than the FCC1 catalyst. The olefin yields for the Y-zeolite and FCC1 catalyst were similar, therefore the olefin to paraffin ratios for the Y-zeolite were lower than the FCC1 catalyst.

ZSM-5 is a well known catalyst additive for FCC catalysts, so we also tested the activity of the ZSM-5 catalyst for catalytic cracking of glycerol. The major difference with ZSM-5 and the other catalysts tested is that ZSM-5 had a lower coke yield (less than 20%) and gave a higher yield of gases and aromatics. This is probably due to the smaller pore size of ZSM-5 zeolite, which makes it difficult for larger aromatic coke precursors to form inside the small ZSM-5 pores. The activity of the catalysts (in terms of total conversion to gases, coke, and aromatics) decreased as Y~FCC1>Al$_2$O$_3$>ZSM5>ECat>>SiC. The gas yields decreased in the order ZSM-5>>ECat>FCC1>Al$_2$O$_3$~Y. The aromatics yield increased linearly with conversion for the ZSM5 catalyst, but first increased and then decreased with further increasing conversion for the FCC1, Y, ECat and Al$_2$O$_3$ catalysts. It has been extensively shown with hydrocarbon cracking that the small ZSM-5 zeolite pore channels make it difficult for aromatics to condensate. Higher yields of coke were seen on the Y, ECat and FCC1 catalysts, due to the larger cage diameter of the Y-zeolite catalyst as well as an extensive mesopore volume which allows higher aromatics condensation, leading to coke formation. The gas phase-carbon yields for ZSM5 decreased in the order CO> ethylene>propylene>CO$_2$>butene>methane>ethane> propane>n-butane. The ZSM5 catalyst gave a much higher ethylene yield and lower methane yield than the other catalysts, which may indicate that, on ZSM5, ethylene may be formed through decarbonylation of an oxygenated intermediate rather than via the cracking of longer chain hydrocarbons.

The olefin-to-paraffin ratio for these catalysts was greater than 10 in most cases, as shown in FIG. 7. The olefin-to-paraffin ratio for C$_2$ compounds was extremely high (e.g. greater than 60) for the ZSM5 catalyst. For the ECat and FCC1 catalyst the C$_3$ and C$_4$ olefin to paraffin ratio decreased as the conversion increased, which goes in parallel with the increases in coke. The olefin-to-paraffin ratio for iso-C$_4$ compounds decreased in the order Al$_2$O$_3$> FCC1> ECat>ZSM5>Y.

Example 2

Figure 8A:
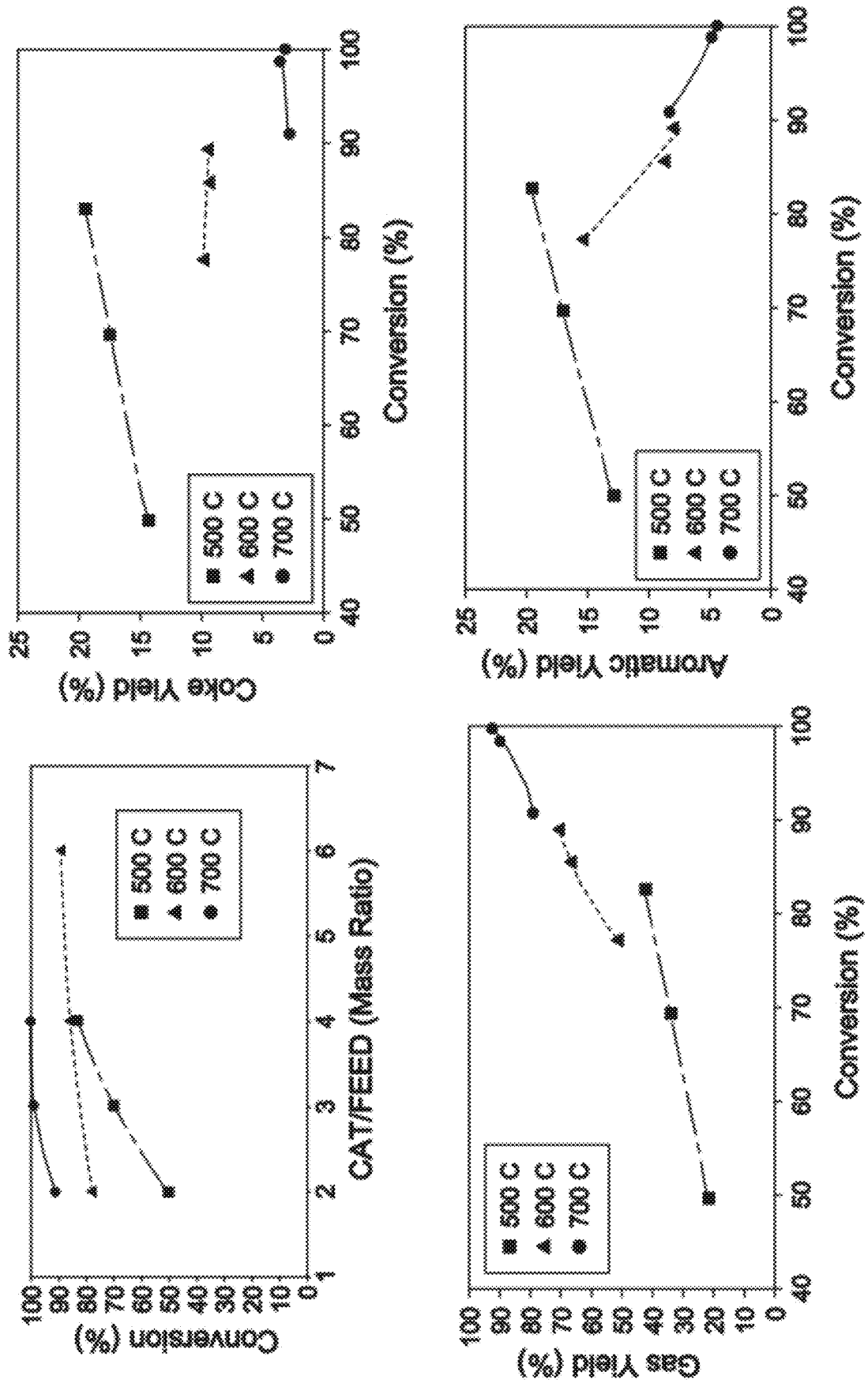
FIG. 8 shows the effect of temperature on the catalytic cracking of a 50 wt % glycerol-water solution with ZSM-5 catalyst in MAT reactor. (Key: Squares-500° C., Triangles-600° C., Circles-700° C. Glycerol feed into reactor as a 50 wt % glycerol-water mixture. Yields are based on carbon molar selectivity. Conversion for pure glycerol feed includes coke plus gases plus aromatics.)
Figure 8B:
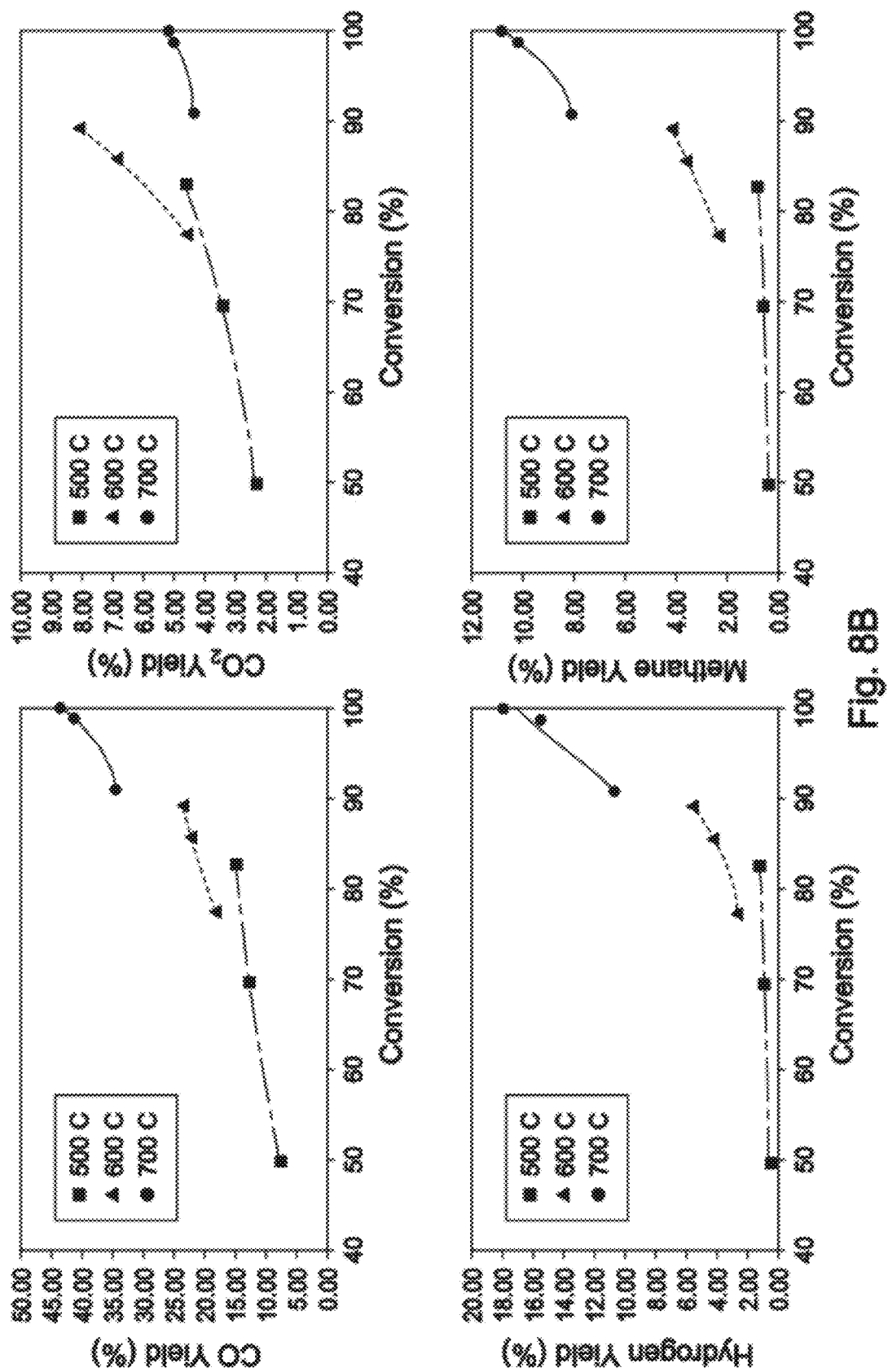
Figure 8C:
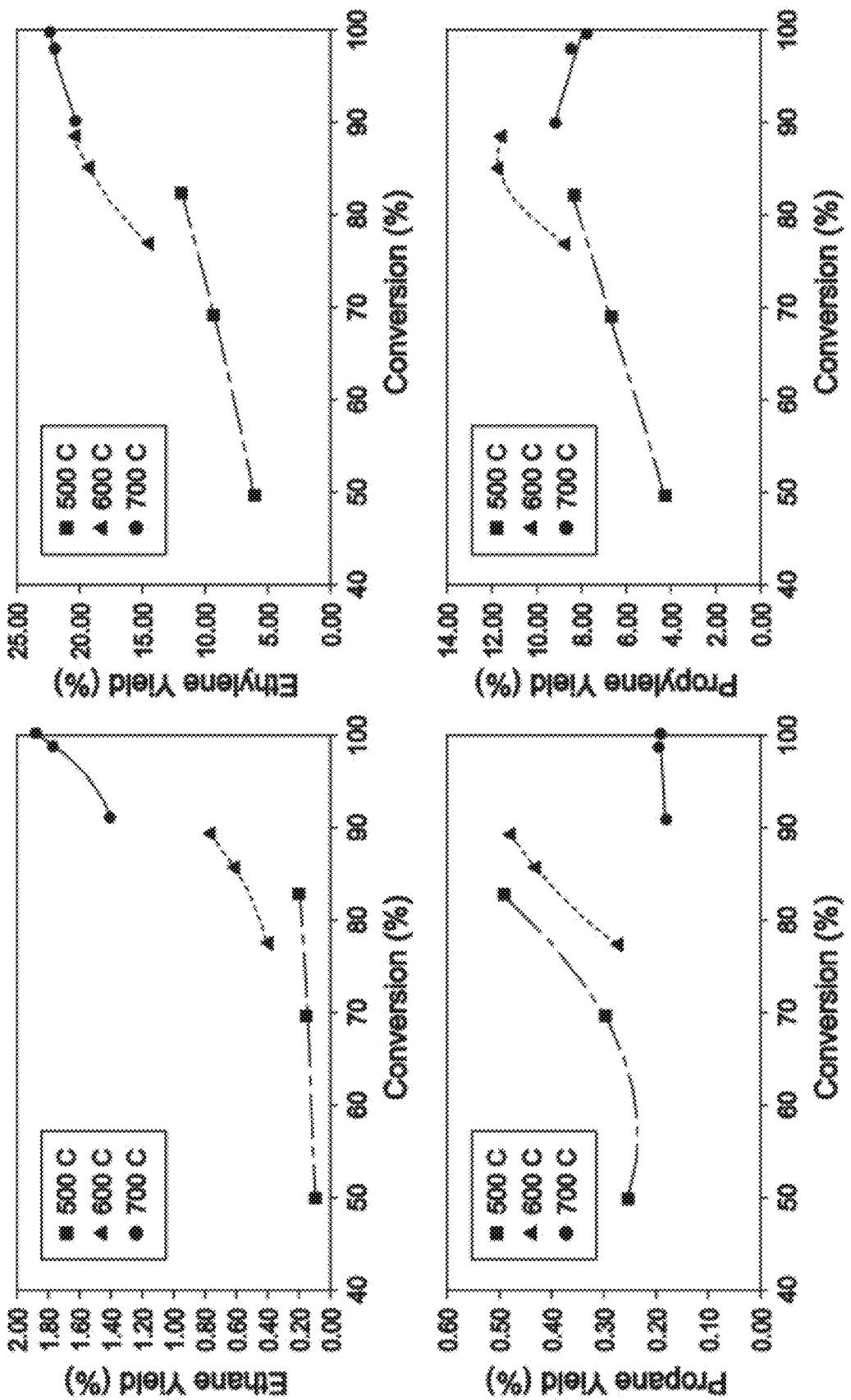
Figure 9:
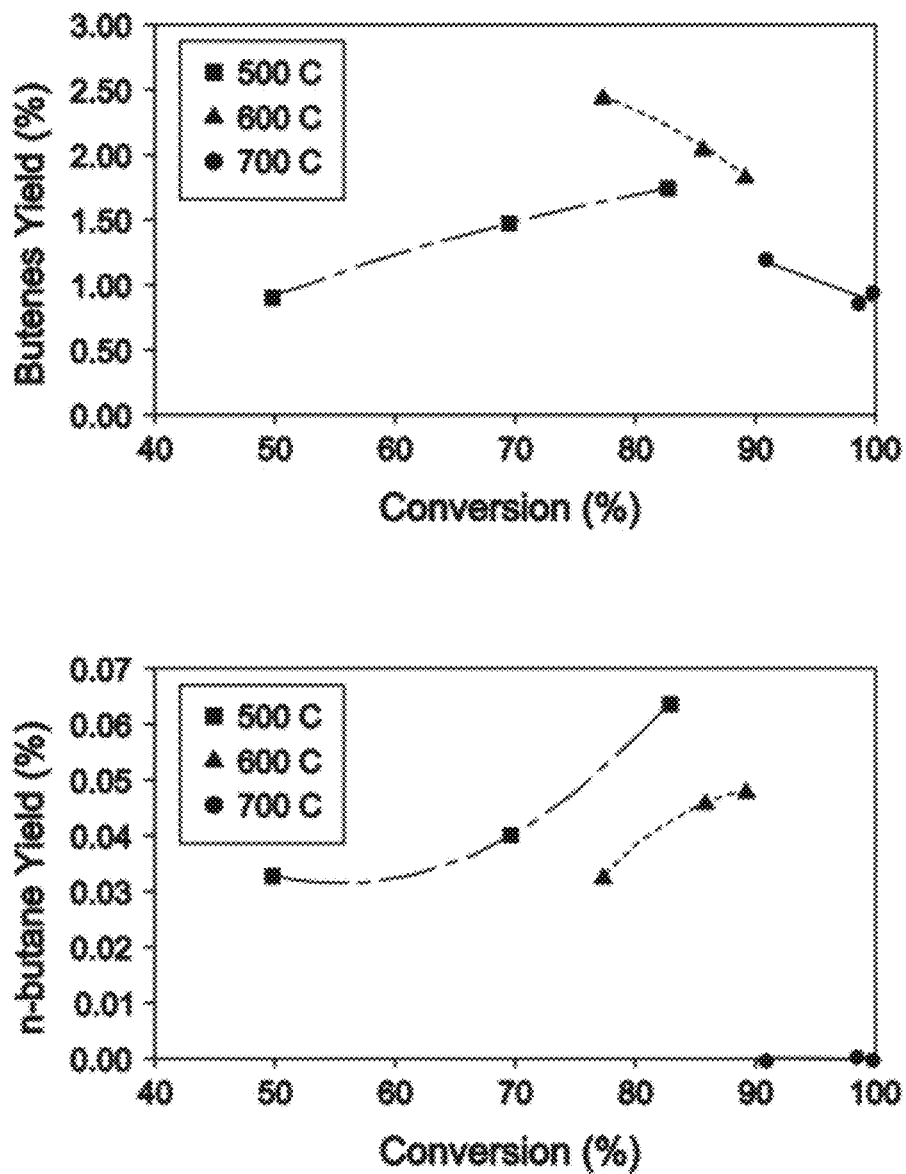
FIG. 9 shows the effect of temperature on gas-phase yields for the catalytic cracking of a 50 wt % glycerol-water solution with ZSM-5 catalyst in MAT reactor. (Key: Squares-500° C., Triangles-600° C., Circles-700° C. Glycerol fed into reactor as a 50 wt % glycerol-water mixture. Yields are based on carbon molar selectivity. Conversion for pure glycerol feed includes coke plus gases plus aromatics.)
Figure 10:
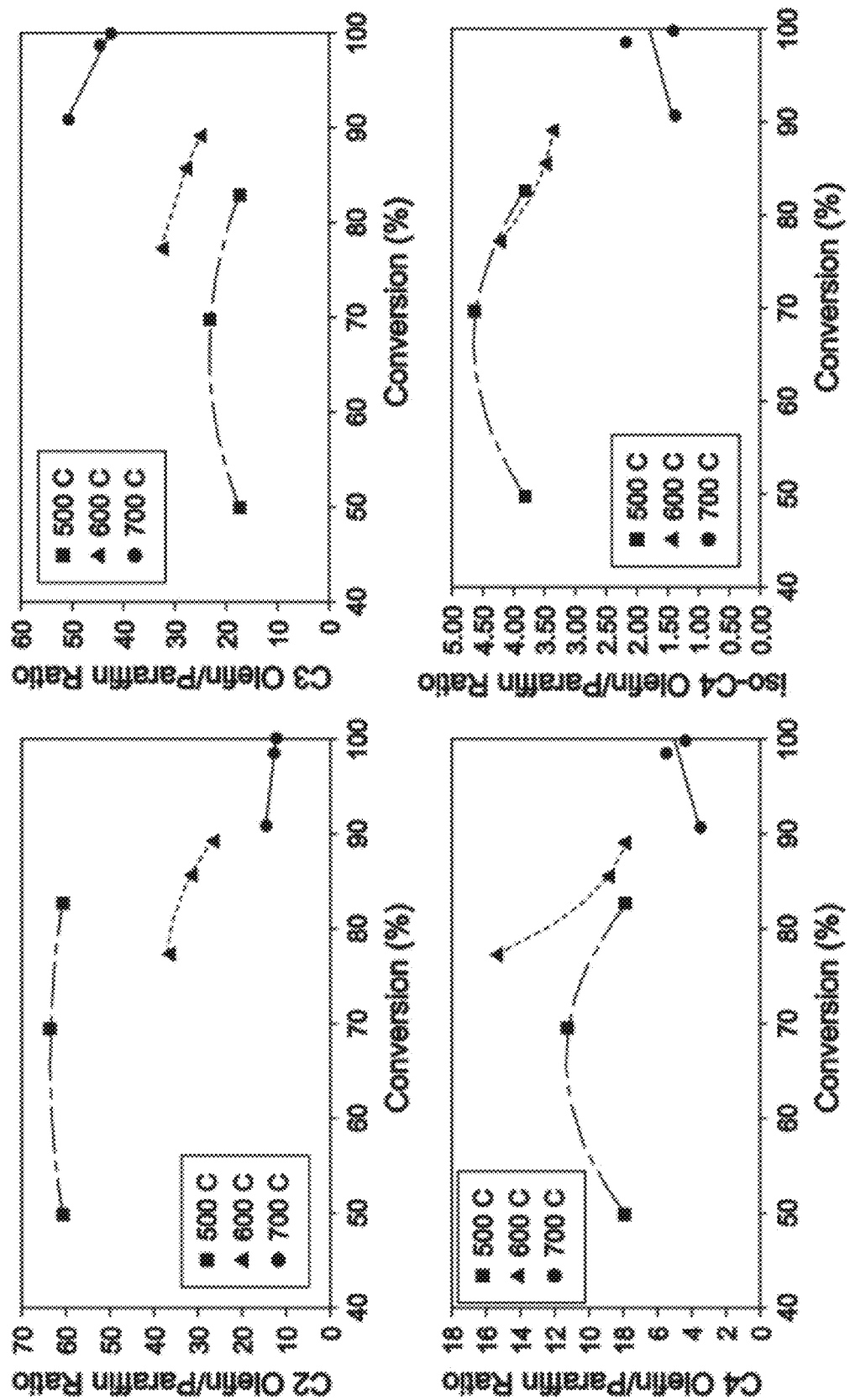
FIG. 10 shows the effect of temperature on olefin-to-paraffin ratio for the catalytic cracking of a 50 wt % glycerol-water solution with ZSM-5 catalyst in MAT reactor. (Key: Squares-500° C., Triangles-600° C., Circles-700° C. Glycerol fed into reactor as a 50 wt % glycerol-water mixture. Yields are based on carbon molar selectivity. Conversion for pure glycerol feed includes coke plus gases plus aromatics.)

FIGS. 8-10 show the effect of temperature on the catalytic cracking of glycerol with ZSM5. The activity for cracking of glycerol increased with temperature, as shown in FIG. 8. As the temperature increased, the coke yield significantly decreased (FIG. 8), and the CO, H$_2$, and ethylene yields increased (FIG. 9). Similar temperature effects were observed for catalytic cracking of glycerol with FCC1. At 500° C. the coke yield increased linearly with conversion, whereas at 600 and 700° C. the coke yield did not increase with conversion. The aromatics at 500° C. also increased linearly with conversion, whereas at 600 and 700° C. they decreased linearly with conversion, probably as the result of a lower contribution of olefin oligomerization and hydrogen transfer (both exothermic reactions) when the reaction temperature was increased. The gas yield increased with both conversion and temperature.

Example 3

Figure 11A:
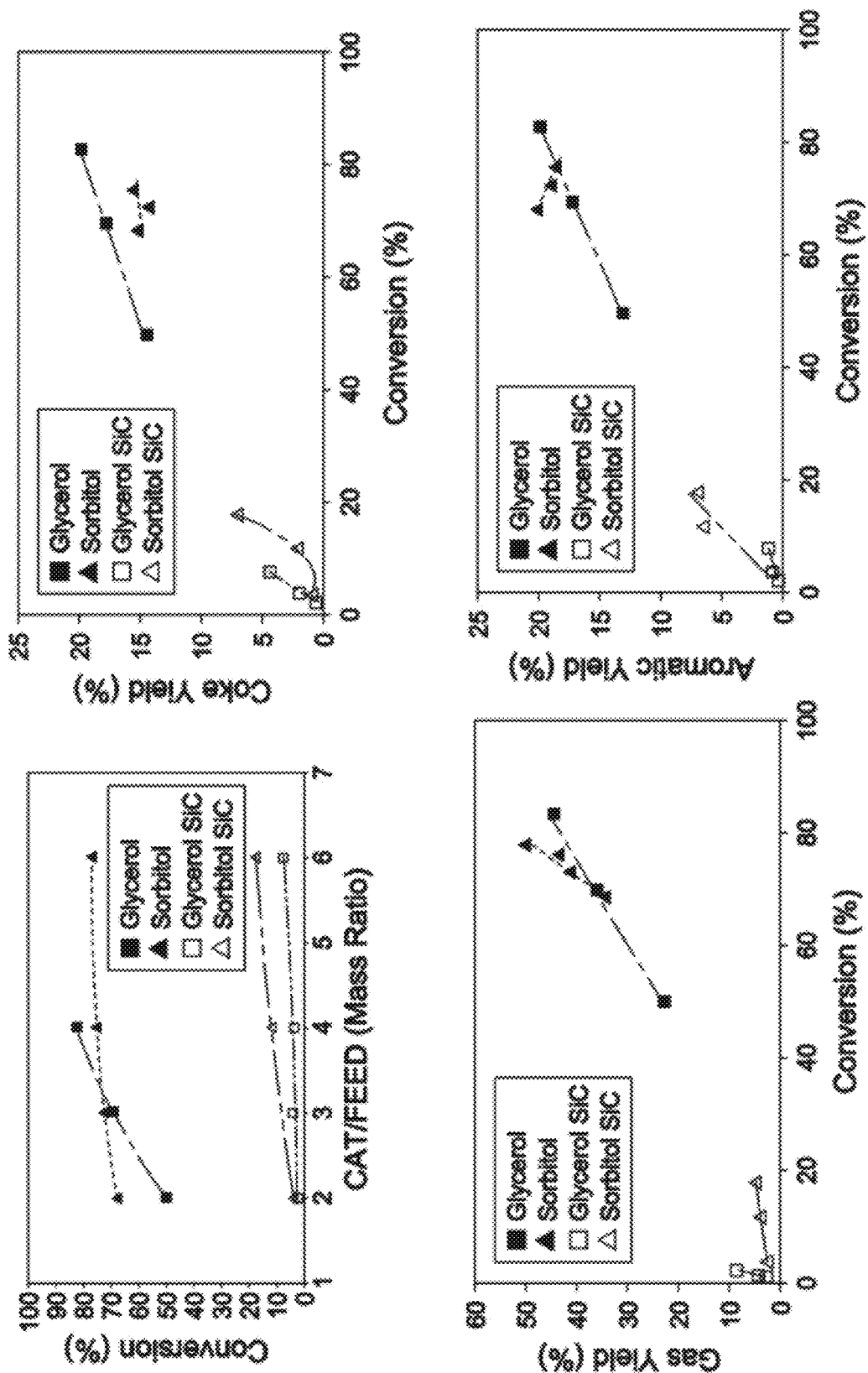
FIG. 11 shows the catalytic cracking of 50 wt % glycerol and 50 wt % sorbitol aqueous solutions using ZSM-5 and silicon-carbide catalysts in MAT reactor at 500° C. (Key: Filled Squares-Glycerol with ZSM-5, Filled Triangles-Sorbitol with ZSM-5, Open Squares-Glycerol with SiC, Open Triangles-Sorbitol with SiC. Conversion includes coke plus gases plus aromatics.)
Figure 11B:
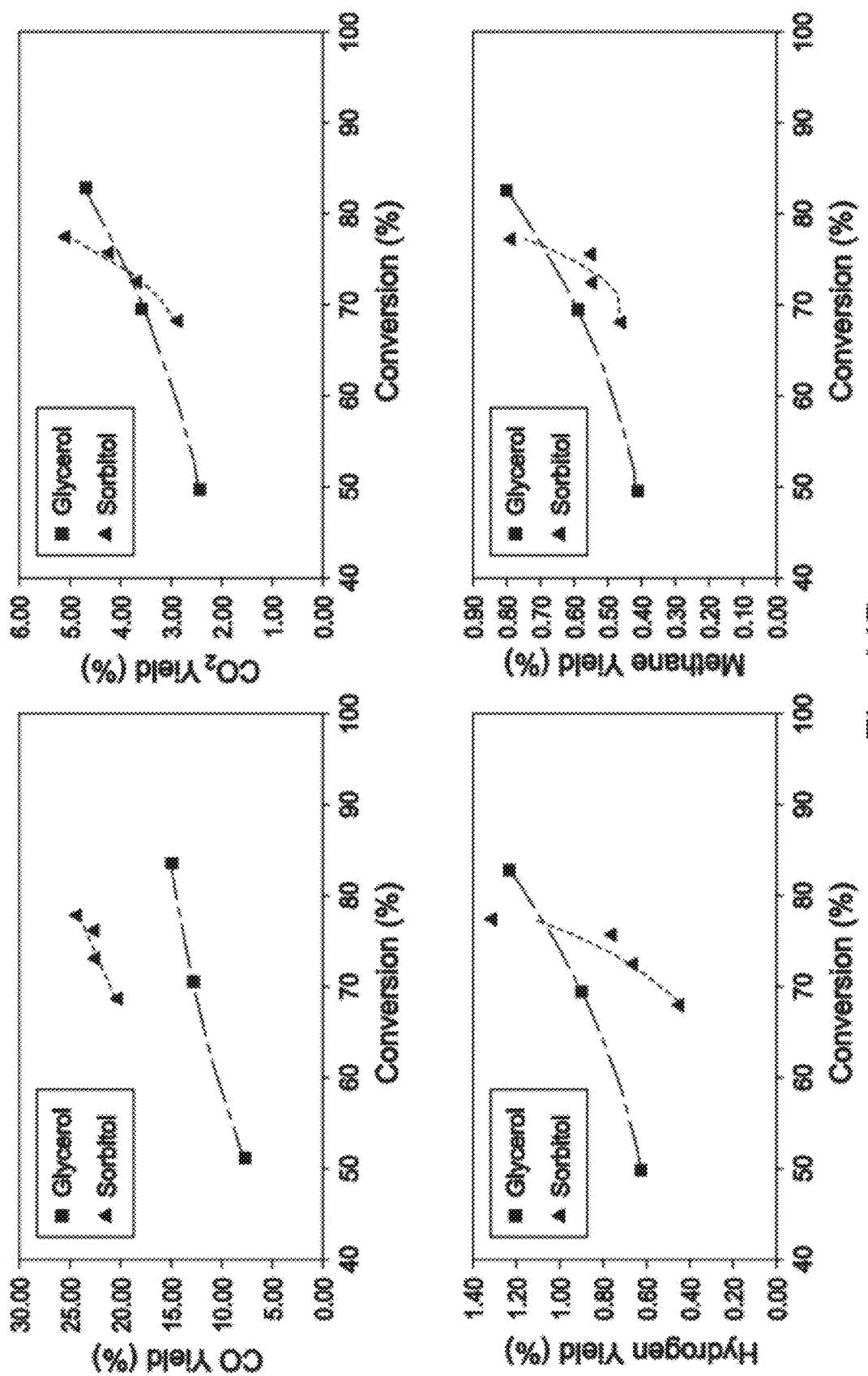
Figure 11C:
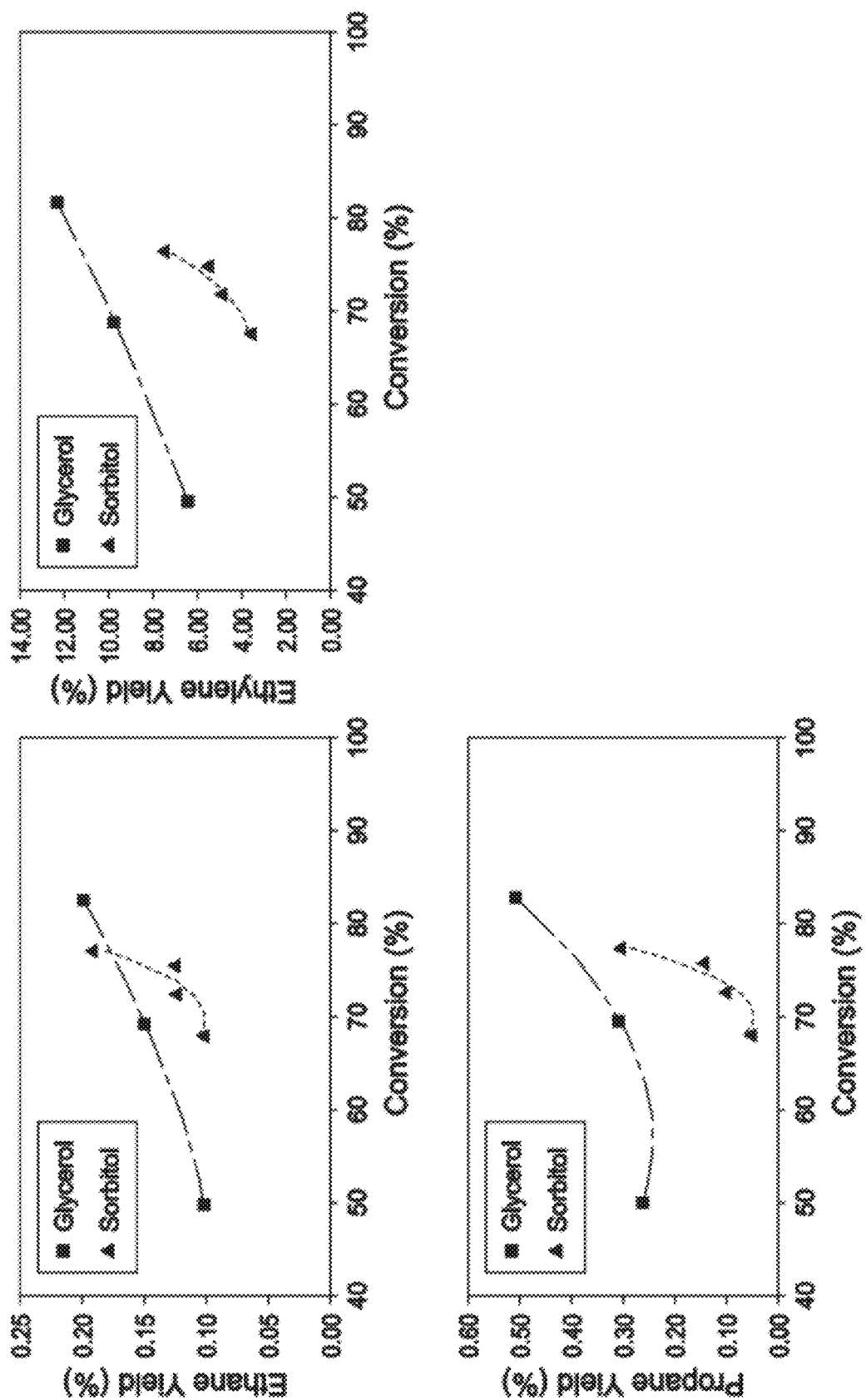
Figure 12:
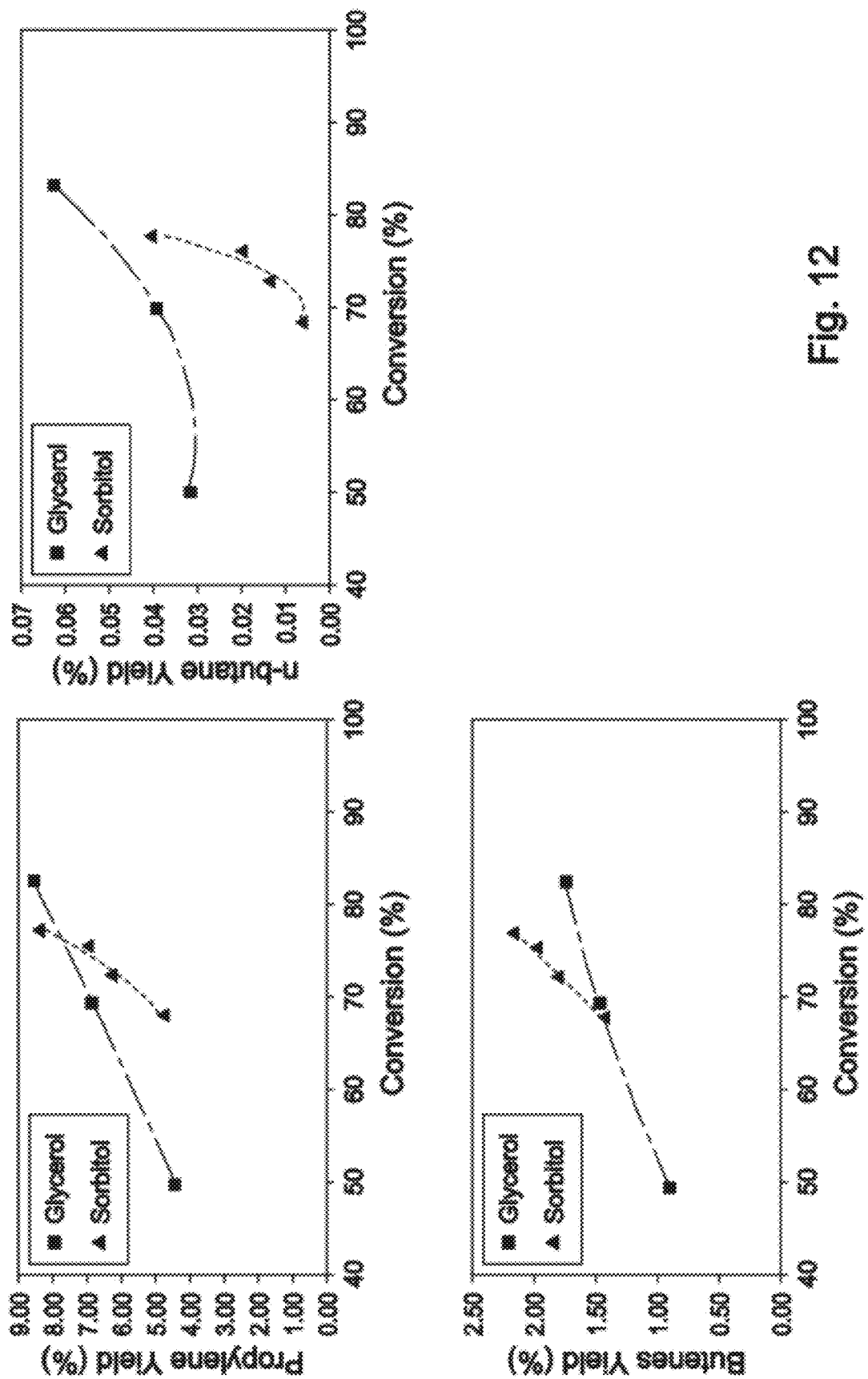
FIG. 12 shows the gas phase-yields of 50 wt % glycerol and 50 wt % sorbitol aqueous solutions for catalytic cracking using ZSM-5 catalyst in MAT reactor at 500° C. (Key: Squares-Glycerol, Triangles-Sorbitol. Conversion includes coke plus gases plus aromatics.)

To test the catalytic cracking of other biomass-derived oxygenated hydrocarbon compounds we used sorbitol as a feed, with ZSM5 and SiC as catalysts. Sorbitol has a lower H/C$_{eff}$ ratio than glycerol. FIGS. 11-12 show the results of aqueous solutions of 50 wt % sorbitol and 50 wt % glycerol feeds in the MAT reactor. The thermal stability of glycerol is greater than that of sorbitol. However, surprisingly, sorbitol and glycerol had similar coke, gas and aromatic yields even though they have different $H/C_{eff}$ ratios.

The gas phase yields for glycerol and sorbitol are shown in FIG. 12. The main differences between the two feeds are that sorbitol had a higher CO yield than glycerol feeds with the ZSM-5 catalyst. The CO and $CO_2$ yield is also higher for the thermal sorbitol reaction with SiC as the "catalyst" (1-2% CO yield at conversions 4-18) than for glycerol (0.3-0.5% CO yield at conversions 2-8%). More hydrogen is required to convert sorbitol into a paraffin or olefin than is the case for glycerol, therefore hydrogen producing reactions (such as CO production) should be greater for sorbitol than for glycerol at similar olefin and paraffin yields. Sorbitol also had a lower ethylene yield than glycerol, with the yields of the other hydrocarbons being fairly similar.

Example 4

Figure 13:
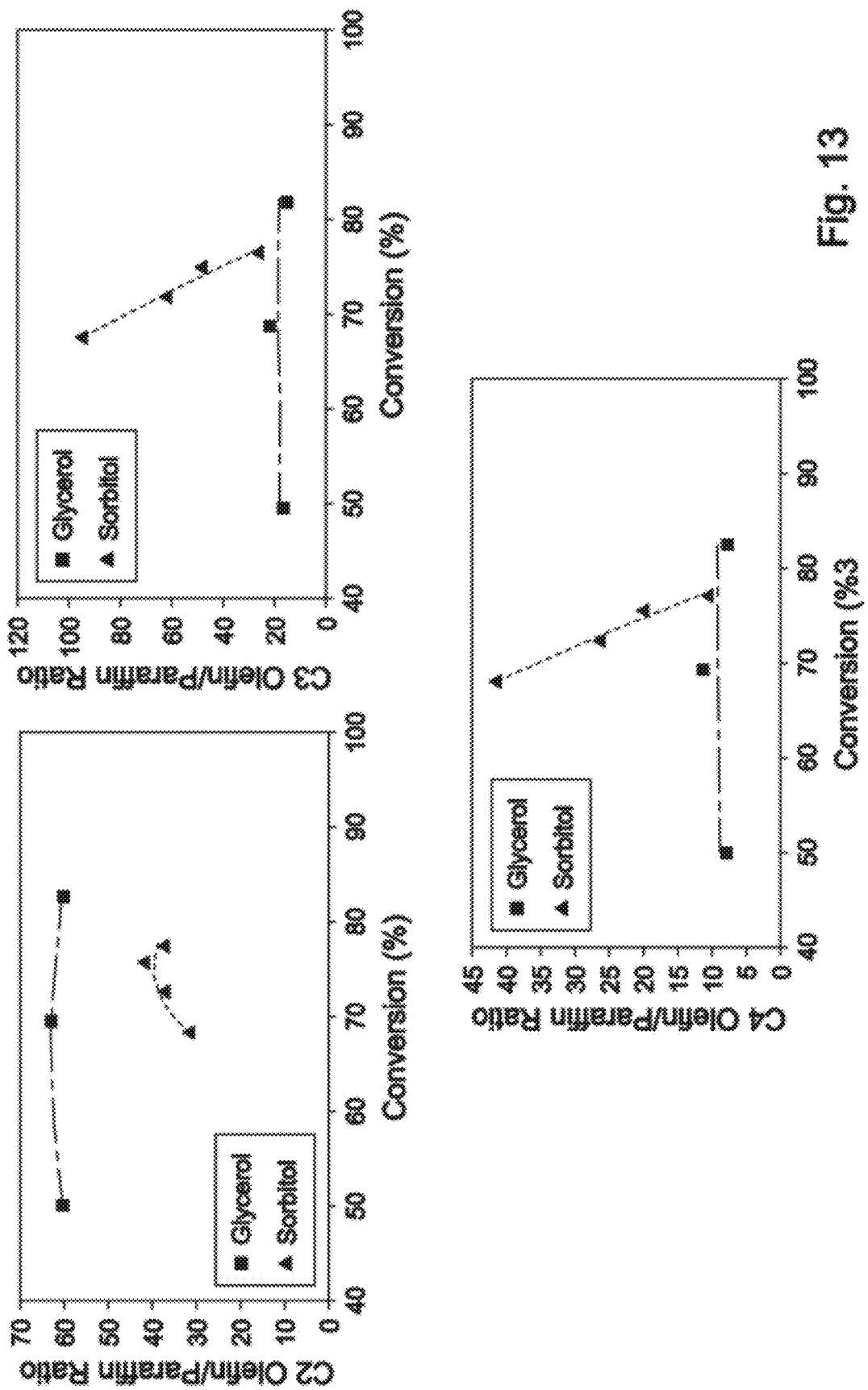
FIG. 13 shows the Olefin-to-Paraffin Ratio for 50 wt % glycerol and 50 wt % sorbitol aqueous solutions for catalytic cracking using a ZSM-5 catalyst in MAT reactor at 500° C. (Key: Squares-Glycerol, Triangles-Sorbitol. Conversion includes coke plus gases plus aromatics.)
Figure 14A:
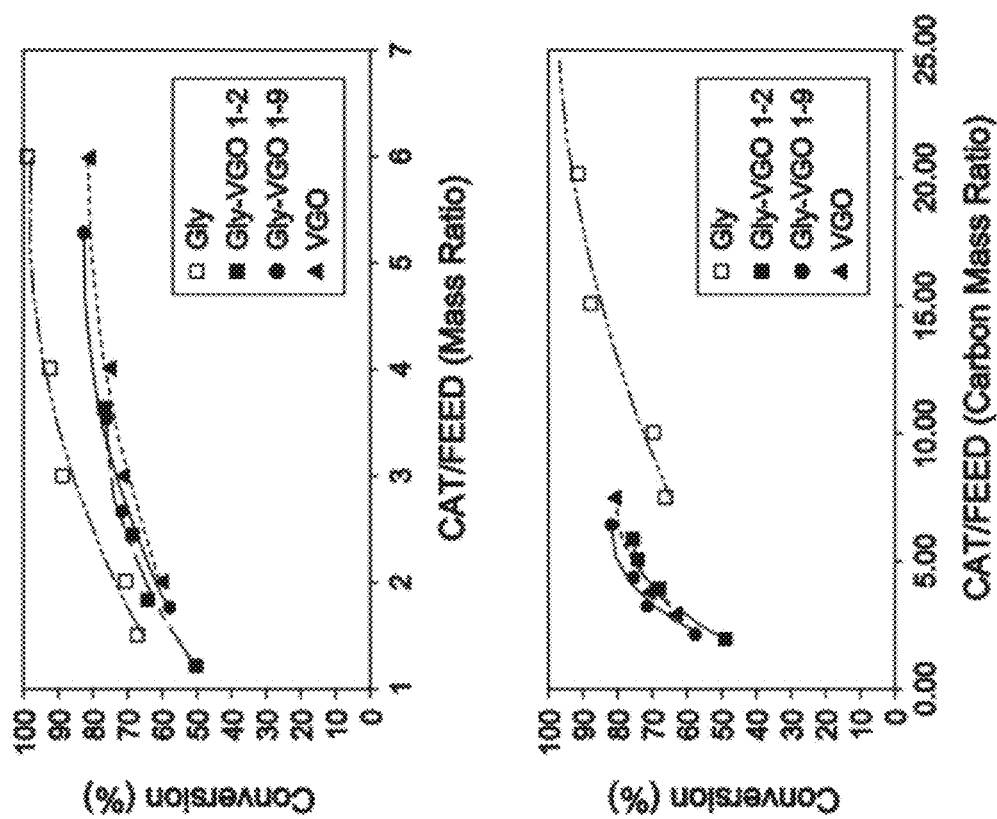
FIG. 14 shows the catalytic cracking of mixtures of vacuum gas oil (VGO) with 50 wt % glycerol, using FCC1 catalyst in MAT reactor at 500° C. (Key: Open Squares: Glycerol, Filled Squares: Glycerol-VGO 1-2 Volume Mixtures, Filled Circle: Glycerol-VGO 1-9 Volume Mixtures, and Filled Triangle: VGO. Dotted line represents yields if an additive effect of glycerol and VGO were observed. Glycerol fed into reactor as a 50 wt % glycerol-water mixture. Yields are based on carbon molar selectivity and molecular weight of VGO is estimated to be that of phenylheptane. Conversion for VGO and glycerol-VGO mixtures includes gases plus coke plus gasoline fraction from simulated distillation. Conversion for pure glycerol feed includes coke plus gases plus aromatics.)
Figure 14B:
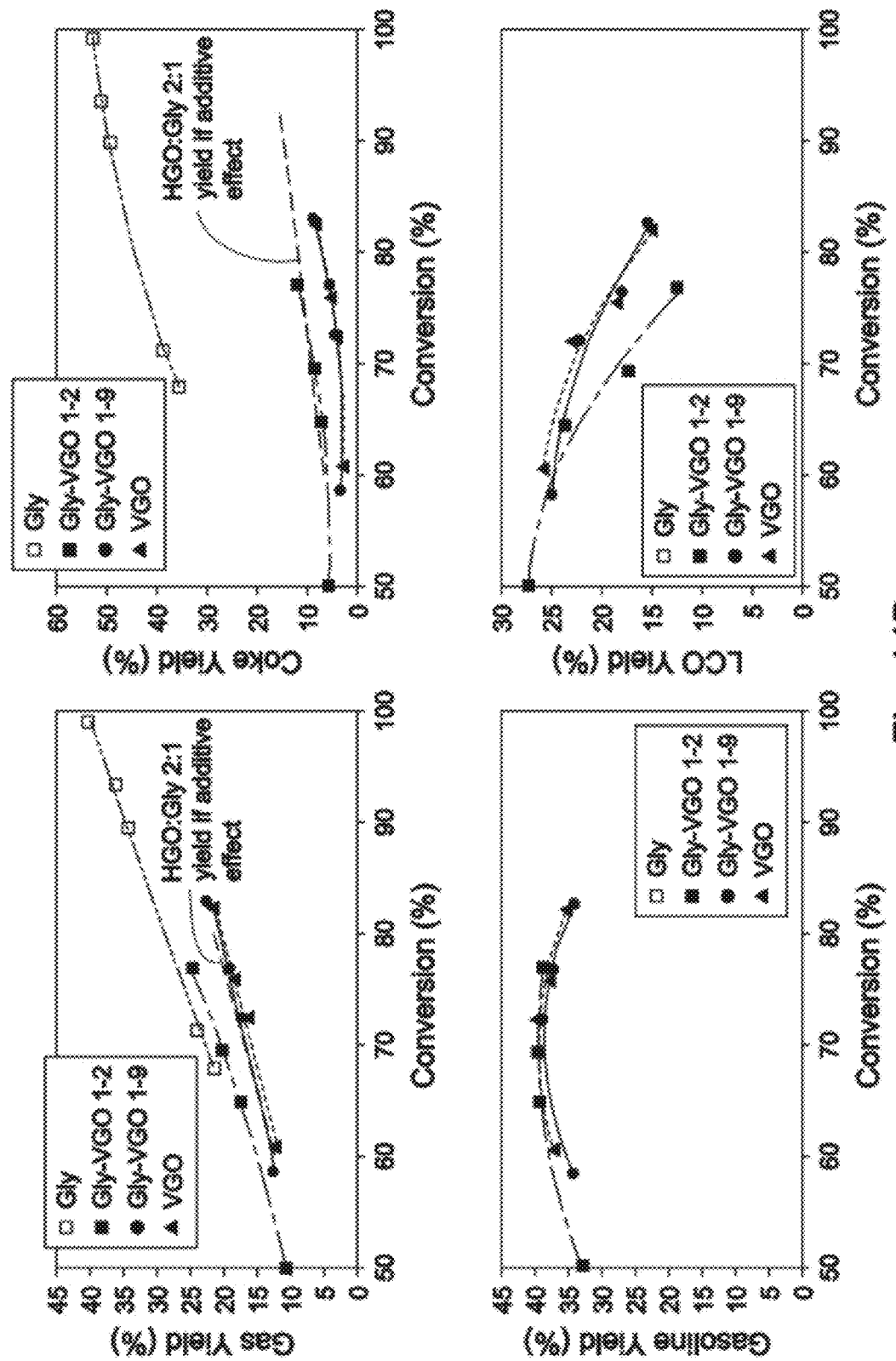
Figure 15A:
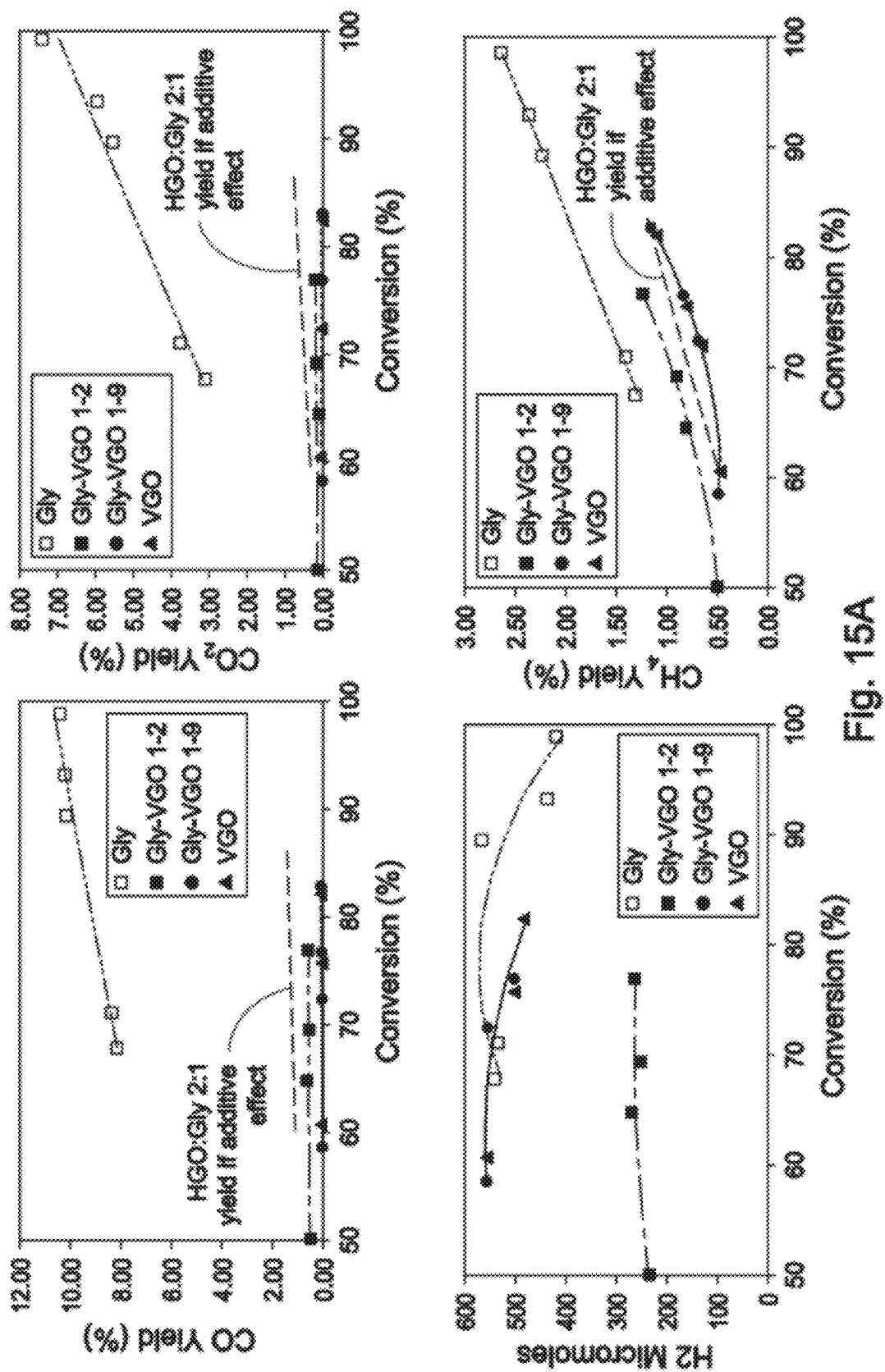
FIG. 15 shows the gas phase yields and micromoles $H_2$ produced in catalytic cracking of mixtures of vacuum gas oil (VGO) with 50 wt % glycerol using FCC1 catalyst in MAT reactor at 500° C. (Key: Open Squares: Glycerol, Filled Squares: Glycerol-VGO 1-2 Volume Mixtures, Filled Circle: Glycerol-VGO 1-9 Volume Mixtures, and Filled Triangle: VGO. Glycerol fed into reactor as a 50 wt % glycerol-water mixture. Dotted line represents yields if an additive effect of glycerol and VGO were observed. Yields are based on carbon molar selectivity and molecular weight of VGO is estimated to be that of phenylheptane. Conversion for VGO and glycerol-VGO mixtures includes gases plus coke plus gasoline fraction from simulated distillation. Conversion for pure glycerol feed includes coke plus gases plus aromatics.)
Figure 15B:
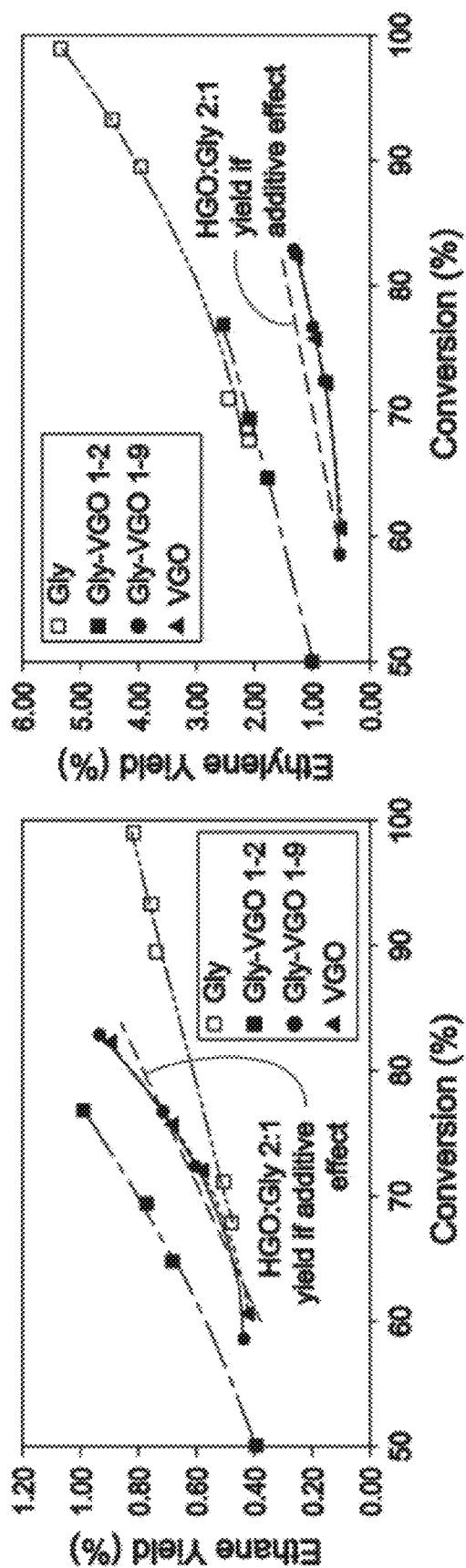
Figure 15B:
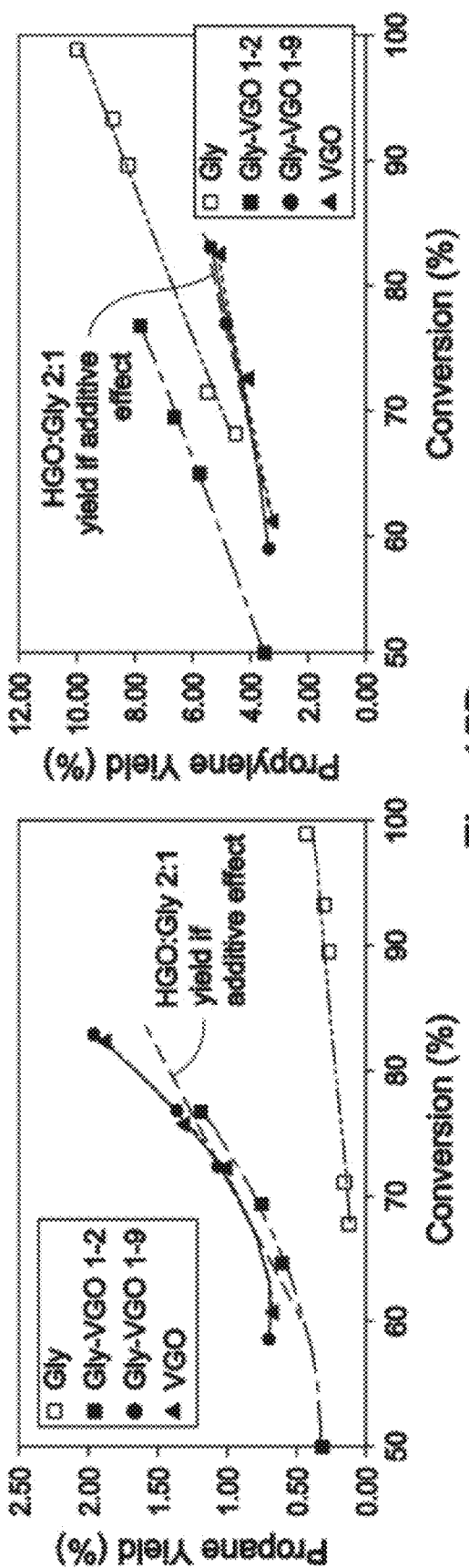
Figure 15C:
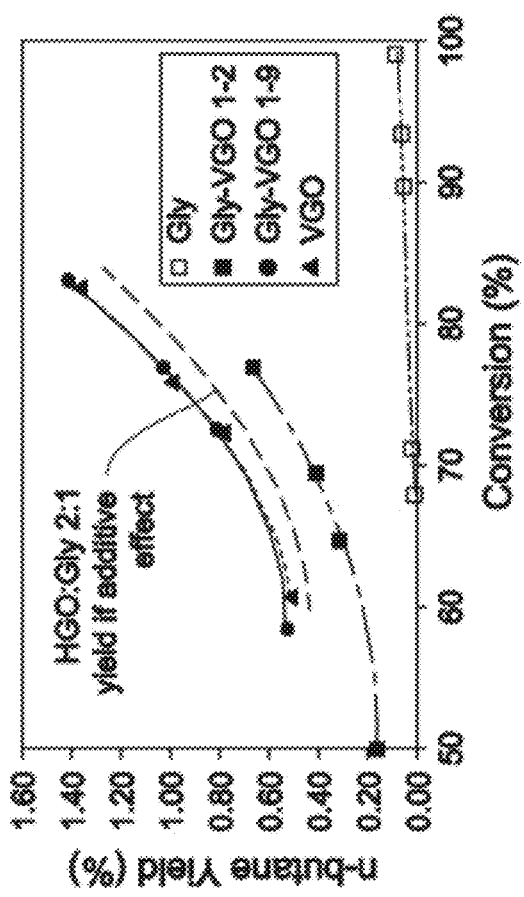
Figure 15C:
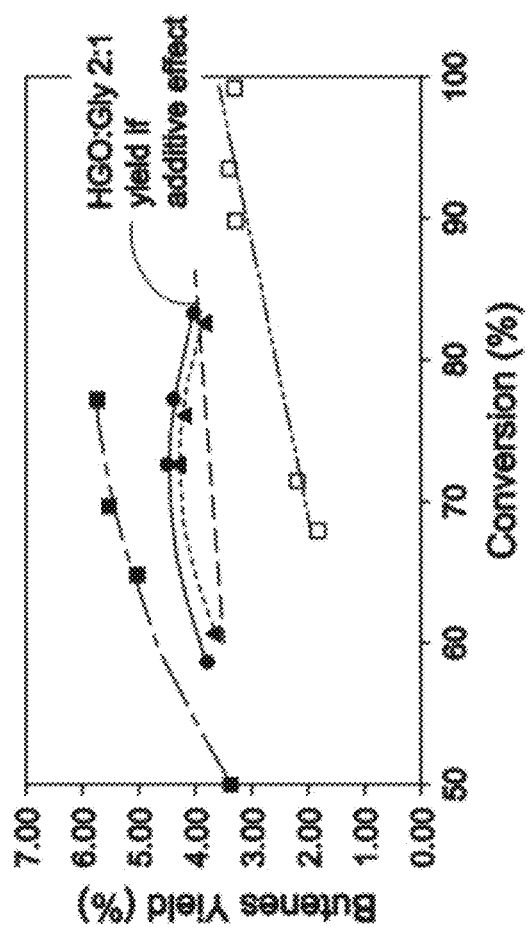
Figure 16:
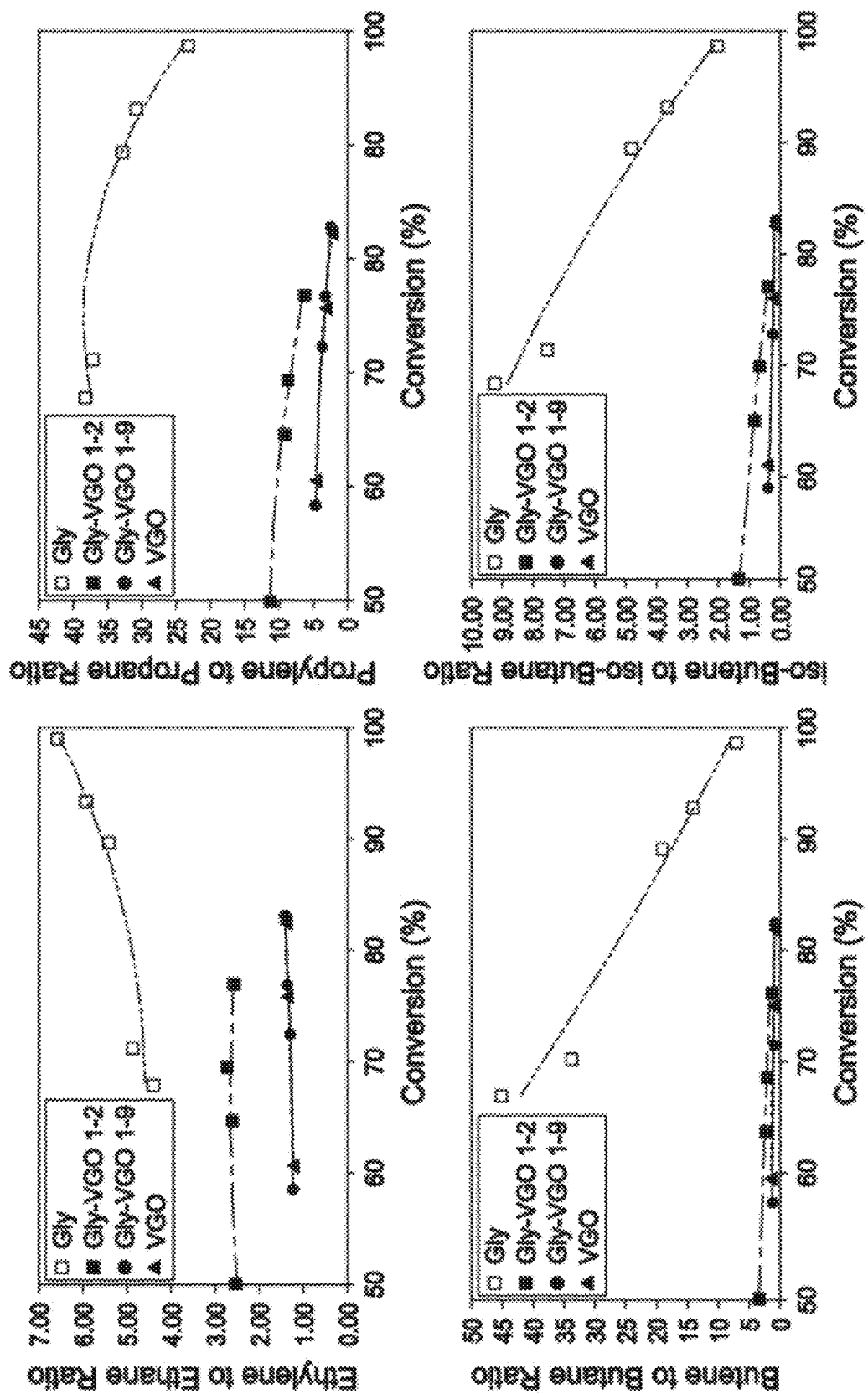
FIG. 16 shows olefin-to-paraffin ratios for catalytic cracking of mixtures of vacuum gas oil (VGO) with 50 wt % glycerol using FCC1 catalyst in MAT reactor at 500° C. (Key: Open Squares: Glycerol, Filled Squares: Glycerol-VGO 1-2 Volume Mixtures, Filled Circle: Glycerol-VGO 1-9 Volume Mixtures, and Filled Triangle: VGO. Glycerol fed into reactor as a 50 wt % glycerol-water mixture. Yields are based on carbon molar selectivity and molecular weight of VGO is estimated to be that of phenylheptane. Conversion for VGO and glycerol-VGO mixtures includes gases plus coke plus gasoline fraction from simulated distillation. Conversion for pure glycerol feed includes coke plus gases plus aromatics.)

To simulate co-feeding of biomass-derived oxygenated hydrocarbon compounds with VGO, we processed pure VGO and mixtures of VGO with glycerol as feedstocks in the MAT reactor with the FCC1 catalyst at 500° C., as shown in FIGS. 13-15. In all the mixtures, a 50 wt % glycerol in water solution was used. The mixed feeds consisted of 9:1 and 2:1 VGO/glycerol-solution mixtures (volumetric ratios), which corresponds to molar carbon ratios of VGO/glycerol of 31:1 and 7:1, respectively. The conversion in these figures includes the gases, coke and gasoline fraction for VGO and VGO mixtures. For the pure glycerol feed the conversion includes gases, coke and aromatics. The catalyst-to-feed ratio in FIG. 17 includes in the feed weight the weights of both the glycerol solution and the VGO.

As shown in FIG. 17, the glycerol solution gave a higher yield to gas, aromatics and coke than VGO. An increase in the amount of glycerol in the VGO-glycerol mixtures slightly increased the conversion. Selectivity effects were barely seen with the 9:1 VGO-glycerol mixture. Apparently the amount of biomass was too small to produce significant changes in the different yields. However, the 2:1 VGO-glycerol mixture introduced an important dilution of the VGO feedstock (at least 3/1 molar ratio between VGO feed molecules and glycerol/water mixture), and significant effects on gas and coke yields were observed. Included as a dashed line in FIGS. 18-19 are the theoretical product yields obtained if glycerol addition to VGO were purely additive (which we will call additive effect). This effect was calculated adding the yields obtained with the glycerol solution and VGO runs, with respect to the mass ratio of both feeds, and normalizing to 100%.

One of the major differences between VGO and glycerol is that glycerol produces more coke, ethylene and propylene than VGO. Adding glycerol to VGO significantly increased the amount of coke, but in a proportion similar to what would be observed as an additive effect. Addition of glycerol to VGO did not change the gasoline yield, but did decrease the light cycle oil (LCO) yield because of a dilution effect with the glycerol feed, as glycerol cracking does not produce LCO fragment but some gasoline-range fragments, including some oxygenated hydrocarbon compounds.

A surprising effect from this example is that the ethylene and propylene yields for the VGO/glycerol mixtures was higher than what would be expected from an additive effect, as shown in FIG. 14. Compared to the VGO, glycerol cracking produced significant amounts of CO and $CO_2$, a similar yield of hydrogen, more methane and ethylene but less ethane, more propylene but less propane, and much less butanes and butane.

Example 5

To simulate feeding of biomass-derived oxygenated hydrocarbon compounds after VGO injection, we cracked a 50 wt % glycerol solution in a MAT reactor on a FCC1 which had coke deposited onto it before the test, as shown in Table 2. The coke was deposited onto the catalyst in a MAT reactor with heavy gas oil, without the customary regeneration step, prior to passing the glycerol solution. The coke content of the catalyst before the test was 2.0 weight percent. The pre-coked catalysts had a lower coke yield than the fresh catalyst, as shown in Table 2. However, the pre-coked catalyst exhibited a lower activity than the fresh catalyst. The gas yield obtained with the coked catalyst at a Cat/Feed ratio of 4 was similar to the gas yield of a fresh catalyst obtained at a catalyst-to-feed ratio of 1.5. Yields of the different gas fractions were similar for the hydrocarbons, while more CO and less $CO_2$ were produced on the coked catalyst. Aromatic selectivity were also quite similar for both the fresh and coked catalysts.

TABLE 2

Conversion of 50 wt % aqueous glycerol Solution in MAT reactor at 500° C. for 30 seconds with FCC1 catalyst.

| Catalyst | Coked | Coked | Fresh | Fresh | Fresh | Fresh |
|---|---|---|---|---|---|---|
| Cat/Feed | 4.0 | 8.0 | 1.5 | 2.0 | 3.0 | 4.0 |
| % Conv. Gas | 19.9 | 25.4 | 21.5 | 24.1 | 34.4 | 36.2 |
| % Conv. Coke | 19.0 | 10.6 | 36.6 | 39.7 | 50.2 | 52.0 |
| % Conv. Aromatics | 9.1 | 3.7 | 9.8 | 7.3 | 4.9 | 5.1 |
| Carbon Yields (%) | | | | | | |
| CO | 7.54 | 8.54 | 8.09 | 8.25 | 10.15 | 10.16 |
| $CO_2$ | 2.40 | 1.16 | 3.11 | 3.77 | 5.54 | 5.96 |
| Methane | 1.30 | 1.91 | 1.31 | 1.38 | 2.22 | 2.36 |
| Ethane | 0.49 | 0.64 | 0.48 | 0.50 | 0.74 | 0.75 |
| Ethylene | 1.87 | 3.25 | 2.10 | 2.44 | 3.96 | 4.45 |
| Propane | 0.11 | 0.17 | 0.12 | 0.14 | 0.24 | 0.28 |
| Propylene | 4.19 | 6.58 | 4.44 | 5.36 | 8.10 | 8.60 |
| N-Butane | 0.02 | 0.03 | 0.01 | 0.02 | 0.05 | 0.06 |
| Iso-Butane | 0.04 | 0.04 | 0.03 | 0.04 | 0.12 | 0.18 |
| Butenes | 1.91 | 3.00 | 1.8 | 2.2 | 3.3 | 3.4 |
| $H_2$ Yield | 1.2 | 2.9 | 1.4 | 1.9 | 3.0 | 3.0 |

Example 6

A simulation at very high temperature (740° C.) and very low space velocity (compared to typical conditions in FCC) was carried out, to simulate the injection of a small quantity of a glycerol/water mixture. The very severe conditions were aimed at maximizing the olefin yield from glycerol, as well as lowering the amount of gasoline range oxygenates produced by glycerol processing so that it interacts with VGO processing as few as possible. Results are summarized in table 3.

TABLE 3

| Operating condtions | |
|---|---|
| Temperature (° C.) | 720 |
| WHSV ($h^{-1}$) | 15 |
| yields, wt % | |
| Carbon monoxide | 50.6 |
| Carbon dioxide | 8.8 |

TABLE 3-continued

| | |
|---|---|
| Methane | 10.9 |
| Ethane | 1.4 |
| Ethylene | 13.1 |
| Propane | 0.1 |
| Propylene | 4.9 |
| Butenes | 0.4 |
| Oxygenates | 0.7 |
| C5+ hydrocarbons | 1.1 |
| coke | 7.9 |

REFERENCES CITED

Adjaye, J. D., S. P. R. Katikaneni, et al. (1996). "Catalytic conversion of a biofuel to hydrocarbons: effect of mixtures of HZSM-5 and silica-alumina catalysts on product distribution." *Fuel Processing Technology* 48: 115-143.

Gayubo, A. G., A. T. Aguayo, et al. (2004). "Transformation of Oxygenate Components of Biomass Pyrolysis on a HZSM-5 Zeolite I. Alcohols and Phenols." *Ind. Eng. Chem. Res,* 43: 2610-2618.

Gayubo, A. G., A. T. Aguayo, et al. (2004). "Transformation of Oxygenate Components of Biomass Pyrolysis Oil on a HZSM-5 Zeolite. II. Aldehydes, Ketones, and Acids." *Ind. Eno. Chem. Res.* 43: 2619-2626.

Gayubo, A. G., A. T. Aguayo, et al. (2005). "Undesired components in the transformation of biomass pyrolysis oil into hydrocarbons on an HZSM-5 zeolite catalyst." *Journal of Chemical Technology and Biotechnology* 80: 1244-1251.

Katikaneni, S. P. R., J. D. Adjaye, et al. (1995). "Performance of Aluminophosphate Molecular Sieve Catalysts for the Production of Hydrocarbons from Wood-Derived and Vegetable Oils." *Energy and Fuels* 9: 1065-1078.

Sharma, R. K. and N. N. Bakhshi (1993). "Catalytic Upgrading of Pyrolysis Oil." *Energy and Fuels* 7: 306-314.

Srinivas, S. T., A. K. Dalai, et al. (2000). "Thermal and Catalytic Upgrading of a Biomass-Derived Oil in a Dual Reaction System." *Canadian Journal of Chemical Engineering* 78: 343-354.

What is claimed is:

1. A process for converting biomass to reaction products, the process comprising:
   (a) contacting biomass-derived oxygenated hydrocarbon compounds with an inorganic material having catalytic properties, wherein the inorganic material includes kaolin and at least one zeolite, wherein the biomass-derived oxygenated hydrocarbon compounds comprise cellulose-derived compounds and/or hemicellulose-derived compounds; and
   (b) converting the biomass-derived oxygenated hydrocarbon compounds to reaction products in the presence of the inorganic material,
   wherein the contact time between the biomass-derived oxygenated hydrocarbon compounds and the inorganic material in step (b) is less than 3 seconds.

2. The process of claim 1, wherein the at least one zeolite includes zeolite-USY, beta-zeolite, ZSM-5, zeolite Y, or a combination thereof.

3. The process of claim 1, wherein the at least one zeolite includes ZSM-5.

4. The process of claim 1, wherein the biomass-derived oxygenated hydrocarbon compounds include compounds produced from solid biomass via at least one process chosen from pyrolysis, liquefaction, and a hydrothermal conversion process.

5. The process of claim 1, wherein the biomass-derived hydrocarbon compounds are produced from solid biomass via a pyrolysis reaction.

6. The process of claim 5, wherein the biomass-derived hydrocarbon compounds are produced from solid biomass via a pyrolysis reaction, wherein the biomass-derived hydrocarbon compounds comprise hemicelluloses-derived compounds.

7. The process of claim 6, wherein the solid biomass is wood.

8. The process of claim 1, wherein step (b) is carried out at a reaction temperature ranging from 300° C. to 700° C.

9. The process of claim 1, wherein the reaction products include liquid reaction products, gaseous reaction products, or a combination of liquid and gaseous reaction products.

10. The process of claim 1, wherein the reaction products include at least one of olefins, aromatics, alkanes, coke, hydrogen gas, or carbon monoxide gas.

11. The process of claim 1, wherein the contact time between the biomass-derived oxygenated hydrocarbon compounds and the inorganic material in step (b) is less than 1 second.

12. The process of claim 1, further including directing the biomass-derived oxygenated hydrocarbon compounds into a riser reactor, wherein step (b) includes converting the biomass-derived oxygenated hydrocarbon compounds in the presence of the inorganic material to the reaction products in the riser reactor.

13. The process of claim 1, wherein the reaction products include a fuel.

14. A process for converting biomass to reaction products, the process comprising:
   (a) contacting biomass-derived oxygenated hydrocarbon compounds with an inorganic material having catalytic properties, wherein the inorganic material includes kaolin and at least one zeolite, wherein the biomass-derived oxygenated hydrocarbon compounds comprise cellulose-derived compounds and/or hemicellulose-derived compounds;
   (b) converting the biomass-derived oxygenated hydrocarbon compounds to reaction products in the presence of the inorganic material in a reactor system; and
   (c) combining the biomass-derived oxygenated hydrocarbon compounds and the inorganic material with a crude oil-derived material in the reactor system,
   wherein step (b) includes converting the biomass-derived oxygenated hydrocarbon compounds to the reaction products in the presence of the inorganic material and the crude oil-derived material.

15. The process of claim 14, wherein the crude oil-derived material is vacuum gas oil.

16. A process for converting biomass to reaction products, the process comprising:
   (a) introducing solid biomass comprising hemicellulose into a pyrolysis reactor;
   (b) converting the solid biomass to biomass-derived compounds via pyrolysis in the pyrolysis reactor, wherein the biomass-derived compounds comprise hemicellulose-derived compounds; and
   (c) converting the biomass-derived compounds in the presence of an inorganic material having catalytic properties to reaction products, wherein the inorganic material includes kaolin and at least one zeolite.

17. The process of claim 16, wherein the at least one zeolite includes zeolite-USY, beta-zeolite, ZSM-5, zeolite Y, or a combination thereof.

18. The process of claim 6, wherein the at least one zeolite includes ZSM-5.

19. The process of claim 16, wherein step (c) is carried out at a reaction temperature ranging from 300° C. to 700° C.

20. The process of claim 16, wherein the reaction products include liquid reaction products, gaseous reaction products, or a combination of liquid and gaseous reaction products.

21. The process of claim 16, wherein said pyrolysis reactor comprises a riser reactor and the converting of steps (b) and (c) are both carried out in the riser reactor.

22. The process of claim 16, further including contacting the biomass and the inorganic material with a crude oil-derived material in the pyrolysis reactor, wherein steps (b) and (c) are carried out in the presence of the inorganic material and the crude oil-derived material.

23. The process of claim 22, wherein the crude oil-derived material is vacuum gas oil.

24. The process of claim 16 wherein the hydrocarbons contained in the reaction products have a higher effective hydrogen to carbon ratio (H/C elf) than the biomass or biomass-derived compounds.

25. The process of claim 16, wherein the biomass-derived compounds comprise cellulose-derived compounds.

26. The process of claim 16, wherein step (b) is carried out in the presence of the inorganic material.

27. The process of claim 16, wherein the solid biomass is wood.

\* \* \* \* \*